United States Patent
Slotta

(10) Patent No.: US 8,120,579 B2
(45) Date of Patent: *Feb. 21, 2012

(54) TEXTURED CUSHION FOR CURSOR CONTROL STICK

(75) Inventor: Mark R. Slotta, Highland, MI (US)

(73) Assignee: GIV, LLC, Highland, MI (US)

(*) Notice: Subject to any disclaimer, the term of this patent is extended or adjusted under 35 U.S.C. 154(b) by 1652 days.

This patent is subject to a terminal disclaimer.

(21) Appl. No.: 11/123,883

(22) Filed: May 6, 2005

(65) Prior Publication Data

US 2005/0253810 A1 Nov. 17, 2005

Related U.S. Application Data

(60) Continuation-in-part of application No. 10/804,854, filed on Mar. 19, 2004, now abandoned, which is a continuation of application No. 10/194,715, filed on Jul. 12, 2002, now Pat. No. 6,724,369, which is a continuation-in-part of application No. 09/703,041, filed on Oct. 31, 2000, now Pat. No. 6,621,485, which is a continuation-in-part of application No. 09/281,126, filed on Mar. 29, 1999, now Pat. No. 6,140,998, which is a division of application No. 08/717,220, filed on Sep. 26, 1996, now Pat. No. 5,889,508.

(60) Provisional application No. 60/568,627, filed on May 6, 2004.

(51) Int. Cl.
G06F 3/33 (2006.01)

(52) U.S. Cl. ........ 345/161; 345/162; 345/163; 345/165; 345/166

(58) Field of Classification Search .......... 345/156–172; 341/20, 22, 34; 361/680; 156/209
See application file for complete search history.

(56) References Cited

U.S. PATENT DOCUMENTS

| | | | | |
|---|---|---|---|---|
| 3,613,702 A | * | 10/1971 | Weber | 135/33.4 |
| 3,898,397 A | | 8/1975 | Devore et al. | |
| 4,147,346 A | * | 4/1979 | Giannetti | 473/43 |
| 4,190,697 A | | 2/1980 | Ahrens | |
| 4,536,164 A | * | 8/1985 | Klawitter | 446/143 |
| 4,565,460 A | * | 1/1986 | Kline | 400/490 |
| 4,896,003 A | | 1/1990 | Hsieh | |
| 5,087,904 A | | 2/1992 | DeVolpi | |
| 5,090,421 A | * | 2/1992 | Wagoner, III | 600/587 |
| 5,134,008 A | | 7/1992 | Alm | |
| 5,290,115 A | | 3/1994 | Little | |

(Continued)

FOREIGN PATENT DOCUMENTS

WO    WO 87/02942    5/1987

(Continued)

OTHER PUBLICATIONS

International search report, application No. PCT/US03/21711, dated Feb. 12, 2004.

(Continued)

*Primary Examiner* — Prabodh M Dharia

(74) *Attorney, Agent, or Firm* — MacMillan, Sobanski & Todd, LLC

(57) ABSTRACT

A cushioned cap for a control stick of an electronic device defining a recess for receiving at least a portion of a control stick. The recess includes a lower portion and an upper portion.

15 Claims, 25 Drawing Sheets

U.S. PATENT DOCUMENTS

| | | | |
|---|---|---|---|
| 5,349,263 A * | 9/1994 | Katayama et al. | 310/338 |
| 5,407,285 A | 4/1995 | Franz | |
| 5,488,206 A | 1/1996 | Wu | |
| 5,499,041 A | 3/1996 | Brandenburg | |
| 5,504,502 A | 4/1996 | Arita et al. | |
| 5,568,987 A | 10/1996 | Frantz | |
| 5,570,112 A | 10/1996 | Robinson | |
| 5,670,988 A | 9/1997 | Tickle | |
| 5,691,747 A | 11/1997 | Amano | |
| 5,694,123 A | 12/1997 | Selker et al. | |
| 5,701,142 A * | 12/1997 | Brown et al. | 345/168 |
| 5,705,778 A | 1/1998 | Matsui et al. | |
| 5,708,562 A | 1/1998 | Agata et al. | |
| 5,712,660 A * | 1/1998 | Martin | 345/161 |
| 5,754,166 A | 5/1998 | Baba | |
| 5,784,633 A * | 7/1998 | Petty | 710/60 |
| 5,786,805 A * | 7/1998 | Barry | 345/159 |
| 5,798,754 A | 8/1998 | Selker et al. | |
| 5,825,308 A * | 10/1998 | Rosenberg | 341/20 |
| 5,870,082 A | 2/1999 | Selker et al. | |
| 5,889,507 A * | 3/1999 | Engle et al. | 345/161 |
| 5,889,508 A | 3/1999 | Slotta | |
| 6,019,534 A | 2/2000 | Heins | |
| 6,040,758 A | 3/2000 | Sedor et al. | |
| 6,057,540 A | 5/2000 | Gordon et al. | |
| 6,061,004 A * | 5/2000 | Rosenberg | 341/20 |
| 6,088,021 A * | 7/2000 | Yong | 345/163 |
| 6,135,476 A | 10/2000 | Dickie et al. | |
| 6,140,998 A | 10/2000 | Slotta | |
| 6,239,786 B1 | 5/2001 | Burry et al. | |
| 6,266,236 B1 * | 7/2001 | Ku et al. | 361/679.27 |
| 6,271,834 B1 | 8/2001 | May et al. | |
| 6,295,050 B1 * | 9/2001 | Kumhyr | 345/161 |
| 6,323,840 B1 * | 11/2001 | Steinbrunner | 345/161 |
| 6,331,849 B1 * | 12/2001 | VandenBoom | 345/161 |
| 6,353,431 B1 | 3/2002 | Poole et al. | |
| 6,356,257 B1 * | 3/2002 | Kaneo | 345/161 |
| 6,390,423 B1 | 5/2002 | Danzyger et al. | |
| 6,400,354 B1 | 6/2002 | Pin-Chien | |
| 6,433,777 B1 * | 8/2002 | Sawyer | 345/161 |
| 6,606,084 B1 | 8/2003 | Slotta | |
| 6,621,423 B1 | 9/2003 | Cooper | |
| 6,621,485 B1 | 9/2003 | Slotta | |
| 6,724,369 B2 * | 4/2004 | Slotta | 345/161 |
| 6,771,992 B1 * | 8/2004 | Tomura et al. | 455/575.1 |
| 7,057,603 B2 * | 6/2006 | Hill et al. | 345/161 |
| 2003/0206154 A1 | 11/2003 | Hill et al. | |
| 2004/0056841 A1 | 3/2004 | Slotta | |
| 2004/0239623 A1 | 12/2004 | Slotta | |
| 2007/0063974 A1 | 3/2007 | Slotta | |

FOREIGN PATENT DOCUMENTS

| | | |
|---|---|---|
| WO | WO 02/37252 | 5/2002 |
| WO | WO 2004/008278 | 1/2004 |
| WO | WO 2005/109397 | 11/2005 |
| WO | WO 2007/035679 | 3/2007 |

OTHER PUBLICATIONS

International search report, application No. PCT/US05/15976, dated Apr. 25, 2006.

*Rubber Cap of Pointing Device for Notebook PC*, published Sep. 26, 2003. Retrieved from the Internet. <URL: http://www.priorartdatabase.com/ipcom/000019714/>.

IBM ThinkPad 750 and 750C User's Manual, pp. 4-27 through 4-29, dated prior to invention, Apr. 19995.

Santoprene Thermoplastic Rubber. Datasheet [online]. Advanced Elastomer Systems, L.P. [retrieved on Oct. 30, 2000]. Retrieved from the Internet <URL:www.santoprene.com/aes/santoprene.html>.

TPE Applications for Broad Industry Needs. Information sheet [online]. Advanced Elastomer Systems, L.P. [retrieved on Oct. 30, 2000]. Retrieved from the Internet <URL:www.santoprene.com/aes/applications.html>.

Patent Corporation Treaty International Search Report, Forms PCT/ISA/220 & 210, dated Feb. 21, 2003, for International Application No. PCT/US 01/47,338, filed Oct. 30, 2001.

IBM ThinkPad R40. CNET Reviews, 2003 [retrieved May 28, 2003] Retrieved from Internet: <http://computers.cnet.com/hardware/0-1027-405-20833353-1.html>.

IBM ThinkPad R40. PC Watch Japan, Jan. 29, 2003; [retrieved May 28, 2003] Retrieved from Internet: <http://pc.watch.impress.co.jp/docs/2003/0129/ibm.htm>.

* cited by examiner

TEXTURED CUSHION FOR CURSOR CONTROL STICK

CROSS REFERENCE TO RELATED APPLICATIONS

This application claims the benefit of U.S. Provisional Application No. 60/568,627, filed May 6, 2004, and is a Continuation-In-Part of U.S. patent application Ser. No. 10/804,854, filed on Mar. 19, 2004 now abandoned, which was a Continuation of U.S. patent application Ser. No. 10/194,715, filed on Jul. 12, 2002, now U.S. Pat. No. 6,724, 369, which was a Continuation-In-Part of U.S. patent application Ser. No. 09/703,041, filed on Oct. 31, 2000, now U.S. Pat. No. 6,621,485, which was a Continuation-In-Part of U.S. patent application Ser. No. 09/281,126, filed on Mar. 29, 1999, now U.S. Pat. No. 6,140,998, which was a Divisional of application Ser. No. 08/717,220 filed Sep. 26, 1996, now U.S. Pat. No. 5,889,508. The disclosures of each of the above-mentioned applications are incorporated herein by reference.

BACKGROUND OF THE INVENTION

This invention relates in general to a computer-input device and in particular to a cursor-pointing device (cursor control stick), of a notebook-type portable computer, cellular phone, personal digital assistant, or similar device.

A finger mouse or cursor control stick, as used in this application, is a man-machine interface device, which controls the motion of a computer display cursor. In particular, a control stick is a type of miniature joystick, which is intended to be operated by the tip of one finger of the user.

Typically, a control stick is mounted in a central location on a computer keyboard, such as between the "G", "H" and "B" keys on a standard "QWERTY"-type keyboard. The control stick has a position sensing mechanism, which detects horizontal pressure in any horizontal direction. The cursor moves in a direction that corresponds to the direction of pressure exerted on the control stick and, in some embodiments, at a speed that corresponds to the amount of pressure exerted on the control stick. The control stick includes an elongated shaft. The shaft of the control stick has a small diameter, thus allowing the control stick to be mounted between the keys of the computer keyboard without causing the placement of the keys to vary greatly from that expected by an experienced user. A cap is typically removably mounted on the upper end of the control stick shaft, in order to provide an enlarged contact surface for a user to press against on the small diameter shaft of the control stick.

Heins, U.S. Pat. No. 6,019,534, discloses a gripping device for a writing instrument with a plurality of annular ribs formed of soft rubber with an internal gel filled chamber. It is known to use a gel material confined in a chamber as is shown in Heins.

SUMMARY OF THE INVENTION

The present invention relates to a computer including a housing, a processor disposed within the housing, a monitor communicably connected to the processor for displaying data, and a control stick communicably connected to the processor for inputting data. The control stick has a cushioned cap comprising a lower portion defining a first diameter and an upper portion, a portion of the upper portion defining a second diameter that is larger than the first diameter.

The invention is also directed towards a keyboard assembly including at least one switch, and a key associated with the at least one switch for actuating the associated switch. A control stick has a cushioned cap comprising a lower portion and an upper portion, the lower portion defining a first diameter, the upper portion defining a second diameter that is larger than the first diameter. A connector is communicably connected to the at least one switch and the control stick. The connector is adapted to be connected to an electronic device such that the at least one key and the cushioned cap are input devices to the electronic device.

The invention is also directed towards a cushioned cap for a control stick includes a lower portion, the lower portion defining a recess for receiving at least a portion of a control stick, and an upper portion. The upper portion includes a generally radially outwardly extending flange formed thereon, the flange extending downwardly to surround at least a part of the lower portion.

An alternate embodiment of the invention relates to a cushioned cap for a control stick including an upper portion, the upper portion including a generally radially outwardly extending flange formed thereon, and a lower portion. The lower portion defines a recess for receiving at least a portion of a control stick, the recess having a first portion having a twelve-sided cross-sectional shape.

An alternate embodiment of the invention relates to a cushioned cap for a control stick including a lower portion defining a first diameter, and an upper portion defining a second diameter that is larger than the first diameter. Each of the upper portion and the lower portion have a durometer between about 60 and about 85 Shore A.

An alternate embodiment of the invention relates to a cushioned cap for a control stick including a lower portion defining a recess for receiving at least a portion of a control stick, and an upper portion having an outer surface including a plurality of nubs, the nubs increasing in height across the outer surface from the center of the outer surface toward the periphery of the outer surface.

An alternate embodiment of the invention relates to a cushioned cap for a control stick defining a recess for receiving at least a portion of a control stick, the recess including a lower portion having a generally rectangular cross-sectional shape and an upper portion having a generally circular cross-section shape.

An alternate embodiment of the invention relates to a cushioned cap for a control stick, the cushioned cap defining a recess for receiving at least a portion of a control stick. The recess includes a lower portion having a generally rectangular cross-sectional shape, and an upper portion having a cross-section that is generally circular with at least two equally spaced notches extending outwardly therefrom.

An alternate embodiment of the invention relates to a cushioned cap for a control stick, the cushioned cap defining a recess for receiving at least a portion of a control stick. The cap includes a lower wall defining a lower portion of the recess to have a generally rectangular cross-sectional shape, and an upper wall defining an upper portion of the recess to have a generally circular cross-section with the exception of notches formed in the upper wall.

An alternate embodiment of the invention relates to a keyboard assembly including at least one key, and at least one switch corresponding to the at least one key. A control stick has a cushioned cap comprising a lower portion and an upper portion, the lower portion defining a recess, at least a portion of the recess having a cross-section that is generally circular except for four triangular equally spaced notches extending outwardly therefrom. A connector is communicably connected to the at least one switch and the control stick, the connector adapted to be connected to an electronic device such that the at least one key and the cushioned cap are user input devices to the electronic device.

An alternate embodiment of the invention relates to a cushioned cap for a control stick having a stepped bore formed partially therethrough, the bore having a first portion with a relatively larger cross-sectional area, the first portion communicating with an opening in the exterior of the cap, and the bore having a second portion having a relatively smaller cross-sectional area relative to the first portion.

Various objects and advantages of this invention will become apparent to those skilled in the art from the following detailed description of the preferred embodiment, when read in light of the accompanying drawings.

BRIEF DESCRIPTION OF THE DRAWINGS

FIG. 20a is an enlarged top view of a third embodiment of the cushioned cap with textured surface illustrated in FIG. 20, taken along the line 20a-20a.

FIG. 21a is a sectional view of the embodiment of the cushioned cap with textured surface illustrated in FIG. 21, taken along the line 21a-21a.

DETAILED DESCRIPTION OF THE PREFERRED EMBODIMENT

Figure 1:
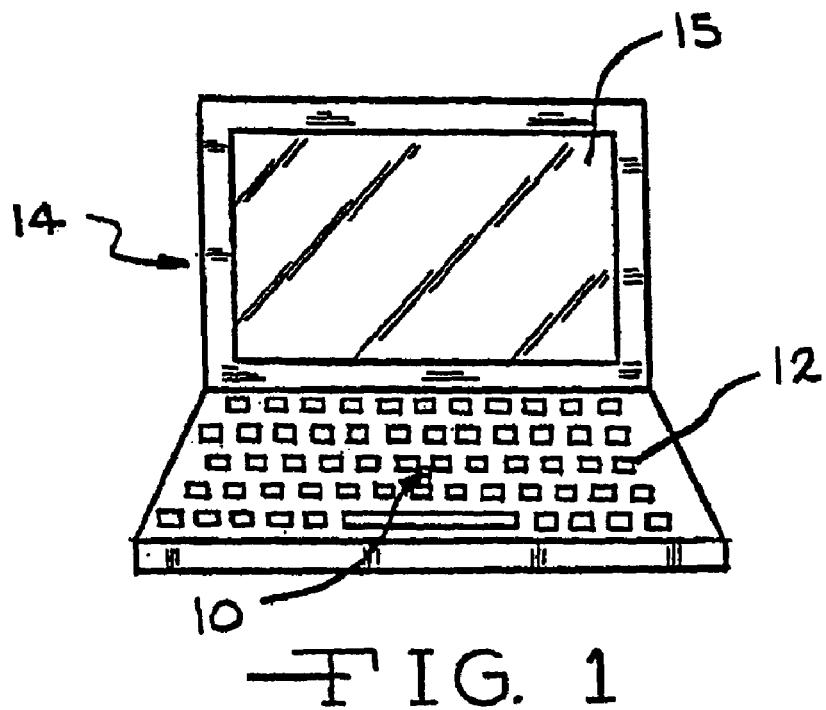
FIG. 1 is a perspective view of a typical portable computer employing a control stick having a cushioned cap in accordance with this invention.

Referring now to the drawings, FIGS. 1 through 6 illustrate a first embodiment of a control stick, indicated generally at 10, according to this invention. The illustrated control stick 10 is a miniature joy stick, such as the TrackPoint, TrackPoint II, or TrackPoint III control sticks on notebook computers sold by the International Business Machines Corporation. However, it will be appreciated, in light of the following disclosure, that the invention may be practiced on control devices other than such miniature joysticks. The cursor control stick of the present invention can be used in various devices such as computers, cellular phones, MP3 players, and personal digital assistants.

The control stick 10 is mounted in a keyboard 12 of a typical notebook-style microcomputer 14 having a pivotally mounted display screen 15. The control stick 10 is mounted at a first end (not shown) to the microcomputer 14, between the keys of the keyboard 12. A cap 18 is removably mounted on the other end 21 of the control stick 10. The control stick 10 is usually made of a plastic material, and translates the pressure on the cap 18 into a command to move a cursor on a video display of the computer 14.

The cap 18 of the control stick 10 is made of a relatively hard elastomeric material. At least a central portion of the outer surface 17 of the cap 18 is provided with an attached cushion 20. The cushion 20 can be made of any resilient material that can be attached to the outer surface 19 of the cap 18. Examples, which may be suitable materials, include soft rubber, soft foam, and polyurethane foam. The preferred material for the cushion 20 is polyurethane foam such as the type used in expandable earplugs. This type of foam product provides a finger contact surface that is relatively soft so as not to damage the tissues in the finger of a user during periods of extended use.

Hardness can be characterized by measuring the force applied to a given area which is required to compress or deflect a material a given distance. For example, a typical prior art cap, such as a cap supplied with the TrackPoint II control stick, is made of a relatively hard elastomeric material. During testing, a probe having a contact surface of approximately 1 square millimeter was pressed against such a cap to cause the probe to deflect the surface of the cap approximately 0.25 millimeters. A force of approximately 15 grams was required to compress the surface of the cap inwardly this small amount. In contrast, one embodiment of the cushion 20 of the present invention required a force of only 5 grams to be exerted by the probe to compress the surface of the cushion 20 the same distance. According to the invention, a cushion 20 having a measurement of hardness (or "durometer") which would permit a probe having a contact surface of approximately 1 square millimeter to deflect the surface of the cushion 20 by at least 0.25 millimeters when urged by a force of 10 grams, would generally be acceptable. The preferred embodiment of the invention has a hardness such that only 5 grams of force is required to cause a probe having a contact surface of 1 square millimeter to deflect the surface of the cushion 20 by at least 0.25 millimeters.

Preferably, the cushion 20 also provides a high coefficient of friction with the user's finger to permit easy positioning of the control stick 10. The polyurethane foam of the cushion 20 is yielding to a degree dependent upon the thickness of the cushion 20. The thickness of the cushion 20 can easily be modified during manufacture to any desired thickness.

Figure 2:
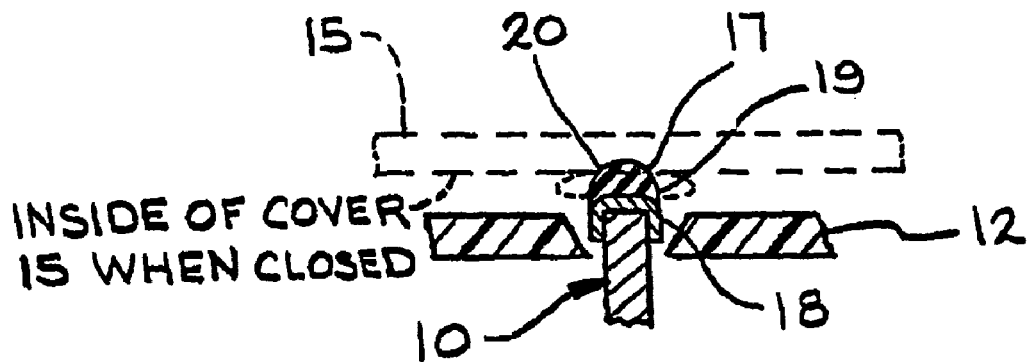
FIG. 2 is a side view, partly in section, of the control stick illustrated in FIG. 1.

Referring to FIG. 2, when the display screen 15 is folded down over the keyboard 12 for storage, as is typical for most notebook computers, the display screen 15 may contact the cushion 20. The cushion 20 is flattened as indicated by the phantom line 19, but will resiliently return to the position indicated by the solid outline of the cushion 20. The resiliency of the cushion 20 allows the cap 18 to have an enlarged contact surface area and greater height above the keyboard 12 for increased comfort of the user, without having to increase the spacing between the display screen 15 and the keyboard 12. It will be appreciated by those skilled in the art that the cushion 20 will preferably not be made from a material which would damage or stick to the display screen 15 if the display screen 15 contacts the cushion 20.

Figure 3:
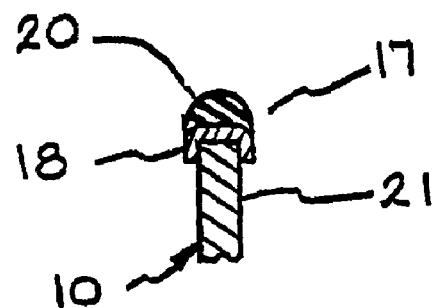
FIG. 3 is an enlarged sectional side view of the cap and the control stick illustrated in FIGS. 1 and 2.
Figure 4:
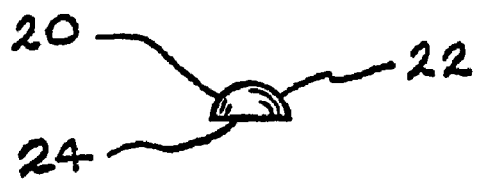
FIG. 4 is a side view of the cushioned cap illustrated in FIGS. 1 through 3.

Referring to FIGS. 3 and 4, the cushion 20 is, preferably, a disk of material having a generally semi-circular cross section. However, the cushion 20 may have any suitable shape, such as that of a flat-ended or hollow-ended cylinder. In the illustrated embodiment, the cushion 20 has a convex end 22, and a second end 24. The convex end 22 is the contact surface of the cushion 20, that is, the surface that the user of the control stick 10 will contact to move the control stick 10. The convex end 22 will generally be a surface providing a good frictional interface. In the preferred embodiment, the convex end 22 is a sealed, smooth, easily cleaned surface, such as a closed cell skin formed on polyurethane foam. The resiliency of the cushion 20 permits the cushion 20 to be deformed and still provide excellent friction, even when the surface thereof is smooth. However, if desired, the surface of the convex end 22 may be textured or knurled. The second end 24 of the cushion 20 will be attached to the outer surface 19 of the cap 18 on the control stick 10. In the preferred embodiment, a suitable adhesive is used to attach the cushion 20 to the outer surface 19 of the cap 18.

Figure 5:
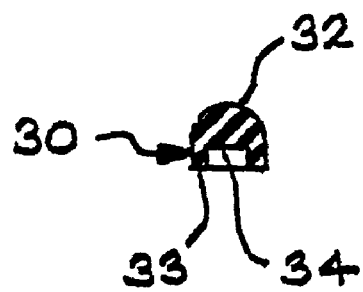
FIG. 5 is a sectional side view of a second embodiment of a cushioned cap in accordance with this disclosure.

FIG. 5 is a sectional view of a second embodiment of the cushion of this invention, indicated generally at 30. The cushion 30 is generally cylindrical and includes a convex end 32, and a relatively flat end 33 opposite the end 32. Although in the illustrated embodiment the end 32 is convex, the end 32 may be formed to any suitable shape, such as a flat or a concave surface, as may the end 22 of the cushion 20.

Figure 6:
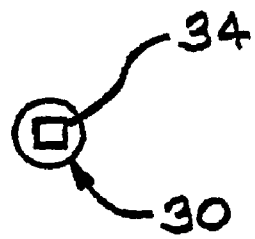
FIG. 6 is a bottom plan view of the cap illustrated in FIG. 5.

A recess 34 is defined in the cushion 30, which generally conforms to the outer surface of the end 21 of the control stick 10. For example, as shown in FIG. 6, the recess 34 may have a square perimeter, if the end 21 of the control stick 10 is square in cross-section. The control stick 10 extends into the recess 34. Preferably, to install the cushion 30 onto the control stick 10, a suitable adhesive is applied to the upper end 21 of the control stick, to the interior surface of the recess 34 in the cushion 30, or to both the upper end 21 of the control stick and to the interior surface of the recess 34 in the cushion 30. The cushion 30 is placed on the end 21 of the control stick 10 so that the cushion 30 adheres to the end 21 of the control stick 10. Of course, the cushion 30 could also be affixed to the control stick 10 by a resilient fit between the recess 34 of the cushion 30 and the end 21 of the control stick 10. The cushion 30 is comprised of a soft material to permit use for an extended period of time without causing irritation to the finger tissue.

It may be desirable to manufacture the cushion 30 with portions having different levels of hardness. For example, the convex end 32 could be softer than the area of the cushion 30 surrounding the recess 34. The harder area surrounding the recess 34 would assist in retaining the cushion 30 on the control stick 10 by maintaining its form, while the convex end 32 of the cushion could be relatively soft.

One method of manufacturing the cushion 30 with portions having different levels of hardness would involve simultaneously injecting two separate types of material simultaneously into a cavity of single mold to form the cushion 30. For example, a first material having relatively soft properties would be injected in the mold at the area where the convex end 32 is formed, and a second material which is harder than the first material would be injected in the mold at the area where the recess 34 is formed. Accelerating agents, compatabilizing agents, fillers, mold release agents, and coloring agents can be introduced as well, as will be appreciated by those skilled in the art. Somewhere between the two ends 32 and 33, the first and second materials come into contact and become affixed to one another. The cushion 30 would, therefore, be a single structure formed from two different materials, having different hardness characteristics when set or cured. For the purposes of the present invention, curing can be accomplished by using any suitable methods of solidifying or hardening a material, such as for example, by adding or removing heat, inducing a catalytic reaction, or containment for a period of time to allow hardening to occur.

Another method of manufacturing the cushion 30 having multiple areas with different levels of hardness would be to form the cushion 30 from a single material, but altering the setting or formation of the material so that the different areas have different hardness characteristics. This alteration of the formation process can be accomplished by varying the temperature gradient surrounding the mold, creating miniature air pockets within selected portions of the material, or by any other suitable manufacturing process.

As an alternate embodiment, it is contemplated that a cushion of the invention could be formed to completely encompass the cap 18 shown in FIGS. 2 and 3, except where the shaft of the control stick 10 extends outwardly therefrom. Such a cushion would have a cavity therein, which includes a flange of material about an opening into the cavity. Such a flange of material would restrict the size of the opening into the cavity to a diameter which is less than the diameter of the cap 18, and thus retain the cushion on the cap 18, either alone or in combination with a suitable adhesive. The opening into such a cushion could be resiliently expanded to slip the cushion onto the cap 18 during assembly, or when the cushion is replaced.

Although the preferred embodiment of the cushion 20 or 30 is for use on a portable notebook computer 14, it is envisioned that the cushion 20 or 30 could be used on any keyboard or in any convenient location on any instrument requiring a control stick-like movement.

It is contemplated that the cushions 20 or 30 of the present invention can be sold separately from a notebook-type portable computer as replacements or substitutes to the original control stick and cap configuration. The cushions 20 or 30 can be sold in a kit form, which preferably includes the necessary materials to affix the cushions 20 or 30 to a control stick of a computer. The kit may include a plurality of cushions 20 or 30 and a suitable adhesive material, such as a container of contact cement or a pressure sensitive self-adhesive strip which is pre-applied to the cushions 20 or 30. For example, if contact cement is supplied with the kit, the user simply applies a coating of contact cement to either the originally supplied cap 18 or the end 21 of the control stick 10, depending on the type of cushion 20 or 30 used. A coating of contact cement is also applied to the cushion 20 or 30. The coatings of contact cement are then allowed to dry. The cushion 20 or 30 is then pressed against the coated portion of the original cap 18 or control stick 10, thereby affixing the cushion 20 or 30 to the control stick 10.

Figure 7:
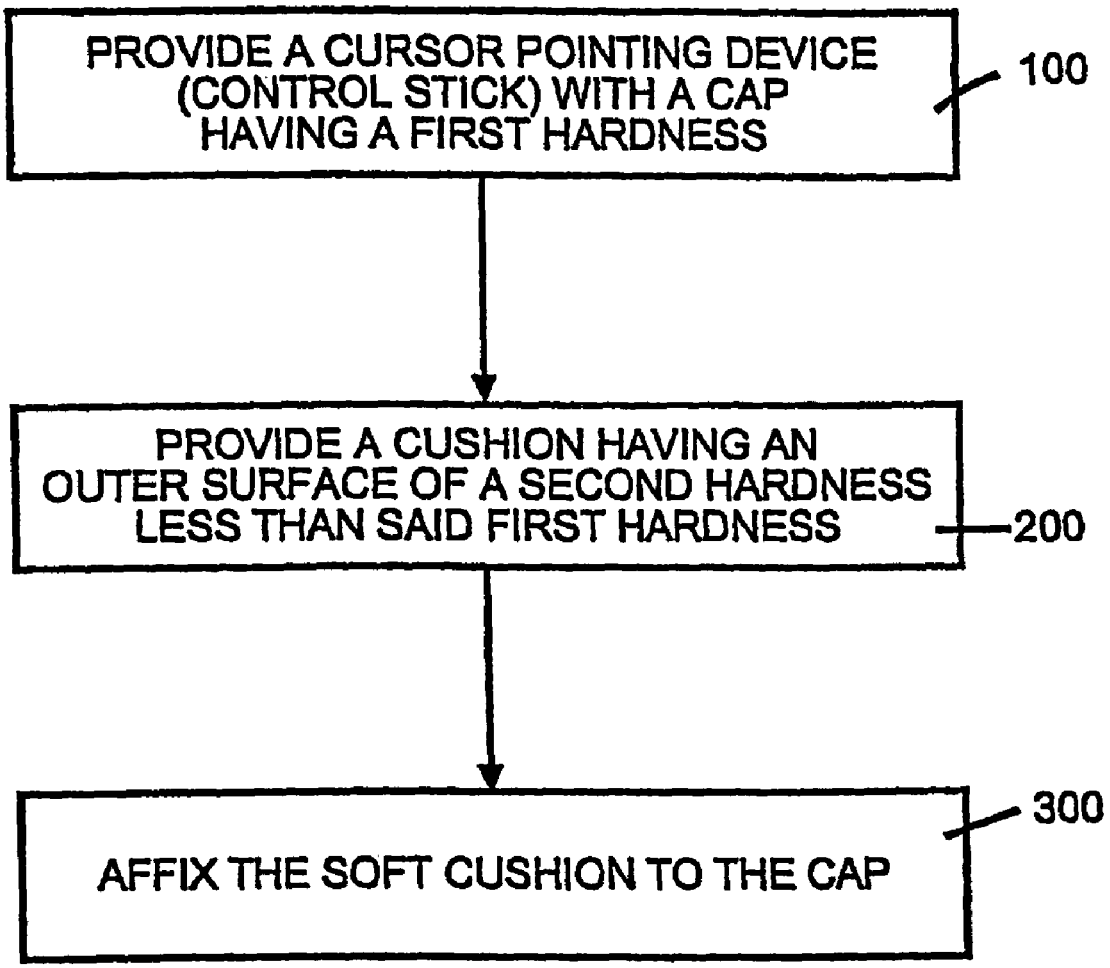
FIG. 7 is a flowchart illustrating a method of manufacturing a control stick in accordance with this disclosure.

FIG. 7 is a flow diagram of a method of forming a cushioned control stick according to the invention. The method of forming a cushioned control stick may be summarized as follows: In a first step 100, a cursor pointing device (control stick) with a cap having a first hardness is provided. In a second step 200, a soft cushion is provided which has an outer surface of a second hardness which is less than the first hardness of the cap (i.e., the cushion is softer than the cap). In a third step 300, the soft cushion is affixed to the relatively harder cap.

It will be appreciated that the soft cushions described above may be formed in a variety of ways, of a variety of materials. For instance, in an embodiment shown in FIG. 8, a cushion, indicated generally at 400, is formed of a gel material. As used herein, the term gel means a semi-rigid solid, and includes a colloidal suspension of a solid dispersed in a liquid, and materials with similar characteristics as load bearing surfaces (e.g., stiffness, hardness, malleability, etc.).

The cushion 400 preferably has a generally cylindrical lower portion 402, and a generally conic upper portion 404, which increases in diameter toward an upper surface 406 of the cushion 400. Thus, at least a portion of the upper portion 404 is generally frustoconical. The upper surface 406 is preferably formed with a depression 408 therein that is suitable to receive a fingertip of a user.

Like the cushions described in the other embodiments above, the cushion 400 will deform if pressed against the computer display screen. It is contemplated that the cushion 400 may be manufactured to have a suitable relatively rigid pocket (seen in FIGS. 9 and 10) to accept the upper end of a control stick of a computer, such as the control stick 10. It is also contemplated that the cushion 400 could otherwise be fixed to a control stick cap like the cap 18 in FIG. 2, such as by adhesively fixing the cushion 400 to the cap. It is also contemplated that the cushion 400 may be manufactured to form an integral part of a removable control stick or portion of a control stick (not shown).

Figure 9:
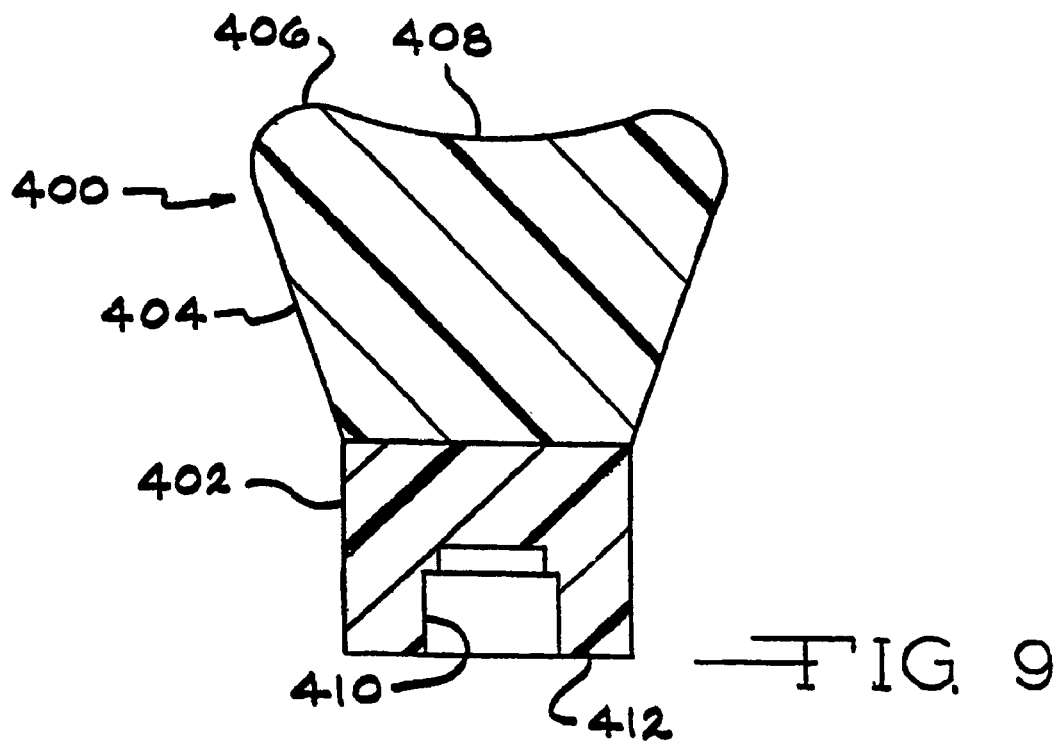
FIG. 9 is a side sectional view of the gel cushion of FIG. 8.

FIG. 9 is a cross sectional view of the cushion 400. The upper portion 404 of the cushion 400 is made from a different material than the lower portion 402. The upper portion 404 may be made from any suitable material. It is believed that thermoplastic elastomeric compounds such as KRATON® thermoplastic elastomers (available from the Royal Dutch/Shell Group) or thermoplastic rubber compounds such as SANTOPRENE® (available from Advanced Elastomer Systems, L.P., 388 South Main Street, Akron, Ohio, U.S.A. 44311) may be particularly suitable for this application. The material from which the upper portion 404 is formed is selected to have a relatively low hardness, so that the upper portion 404 is relatively soft and compliant. The upper portion 404, in a preferred embodiment, is cured to a Shore A durometer of about 3 to about 10, though of course some variance from this softness may be desirable in certain applications, particularly if other features, such as air pockets in the material of the cushion 400, are provided that affect the overall feel of the cushion 400. The material of the upper portion 404 may be a gel or a gel contained in a non-gel pocket. The lower portion 402 defines a pocket 410 in a lower surface 412 thereof. The pocket 410 is adapted to receive the upper end of a cursor control stick, such as the cursor control stick 10. The lower portion 402 is preferably formed of a material with a higher durometer than the upper portion 404. The lower portion 402 may, nevertheless, be formed of any suitable material. It is believed that thermoplastic rubber compounds may be particularly suitable for this application. The lower portion 402 is preferably cured to be relatively harder than the upper portion 404, such as to a Shore A durometer of about 55 to about 65.

These thermoplastic elastomeric and rubber materials are believed to be particularly suitable because of the tack their surfaces have, which gives the cushion 400 a smooth, non-irritating, yet non-slip surface for improved performance.

The cushion 400 may be formed with any suitable machinery of any suitable material by any suitable process. Thermoplastic rubber compounds, for example, can be injection molded, extruded, blow molded and thermoformed with the efficiency and economy associated with thermoplastic materials. As a further example, the cushion 400 may be formed of thermoplastic rubber compounds using a two-step injection process on standard thermoplastic injection molding equipment. In a preferred process, illustrated in FIG. 23, the cushion 400 is formed in a two step injection molding process.

In a first step 451, a first mold is provided, shaped to form one of the lower portion 402 and the upper portion 404. In one preferred embodiment, the first mold is shaped to form the lower portion 402.

In a second step 452, a first material curing to a first durometer is injected into the first mold. In the preferred embodiment in which the first mold is the lower portion 402, the first material is a thermoplastic rubber material that will have a Shore A durometer of about 55 to about 65 when fully cured.

In a third step 453, a second mold is provided, shaped to form the other of the lower portion 402 and the upper portion 404. In the preferred embodiment in which the first mold is the lower portion 402, the second mold is shaped to form the upper portion 404.

In a fourth step 454, the molded first material is removed while only partially cured, and placed into the second mold. In the preferred embodiment, the first material is removed from the first mold as soon as sufficiently cured to be parted from the first mold.

In a fifth step 455, a second material curing to a second durometer, different from the first durometer, is injected into the second mold in contact with the partially cured first material so that the second material bonds to portions of the partially cured first material with which the second material comes into contact. In the preferred embodiment in which the first mold provided in step 451 is the lower portion 402, the second material is a thermoplastic rubber material that will have a Shore A durometer of about 3 to about 10 when fully cured and will form the upper portion 404. The upper portion 404 is thus overmolded onto the partially cured lower portion 402, with the material of the upper portion 404 chemically bonding with the material of the lower portion 402.

In a sixth step 456, both the first and second materials are removed from the second mold. One or both of the first and second materials may be fully cured before the bonded first and second materials are removed from second mold. Similarly, one or both of the first and second materials may only be partially cured before the bonded first and second materials are removed from second mold.

In a preferred embodiment, the mold for the upper portion 404 has an abraded inner surface such that the upper surface 406 of the upper portion 404 is textured corresponding to the abraded surface of the mold. The inner surface of the mold may be abraded in any conventional manner, such as by sand blasting or by electrical discharge machine. In a preferred embodiment, the mold for the upper portion 404 has an inner surface with a textured pattern such that the upper surface 406 of the upper portion 404 is textured corresponding to the textured surface of the mold.

Figure 10:
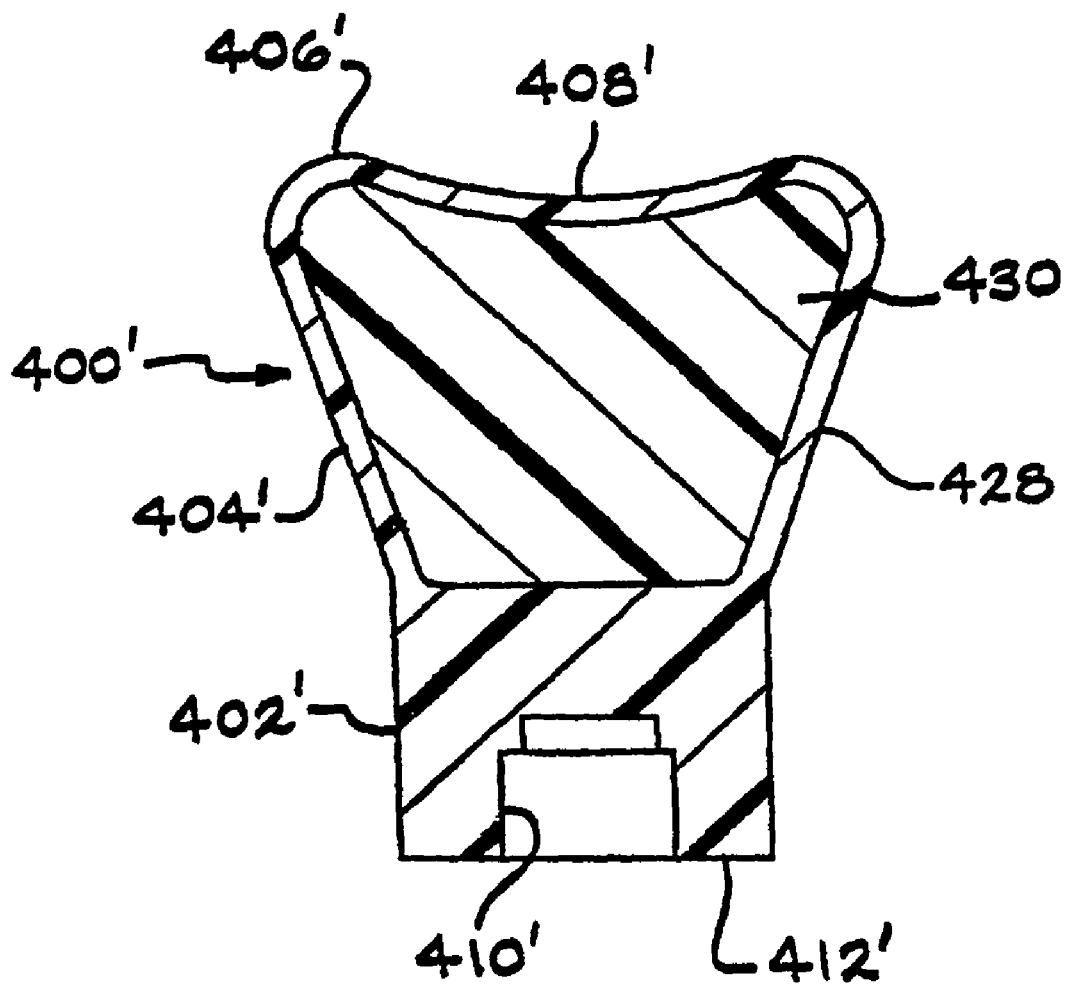
FIG. 10 is a view similar to FIG. 9, except showing an alternate embodiment of the gel cushion.

An alternate embodiment of the cushion 400 is illustrated by the cross sectional view of FIG. 10. A cushion 400' is similar in outer shape to the cushion 400 illustrated in FIG. 8, and has similar qualities of deformation for comfort and protection of computer display screens, and smoothness and tack for ergonomic reasons. However the cushion 400' is constructed somewhat differently, as will be described.

Like the cushion 400, the cushion 400' preferably has a generally cylindrical lower portion 402', and a generally conic upper portion 404', which increases in diameter toward an upper surface 406' of the cushion 400'. The upper surface 406' is preferably formed with a depression 408' therein that is suitable to receive a fingertip of a user.

The lower portion 402' of the cushion 400' is formed of any suitable material, and, like the cushion 400, is preferably formed of a thermoplastic rubber compound such as SANTOPRENE® thermoplastic rubber. The lower portion 402 defines a pocket 410' in a lower surface 412' thereof. The pocket 410', like the pocket 410 in the cushion 400, is adapted to receive the upper end of a cursor control stick, such as the cursor control stick 10.

The upper portion 404' of the cushion 400' is of somewhat different structure that the cushion 400. The outer surface of the upper portion 404' is an envelope 428, which may be formed of any suitable material. It is believed that a thermoplastic rubber compound such as SANTOPRENE® thermoplastic rubber would be suitable in this application, and the envelope 428 is preferably formed integrally with the lower portion 402'. The envelope 428 is filled with a suitable material 430. The material 430 may be any suitable gel, such as a silicone gel, or a thermoplastic elastomeric compound such as KRATON® thermoplastic elastomer formulated to form a low durometer (hardness) (i.e., to form a very soft) material.

Figure 11:
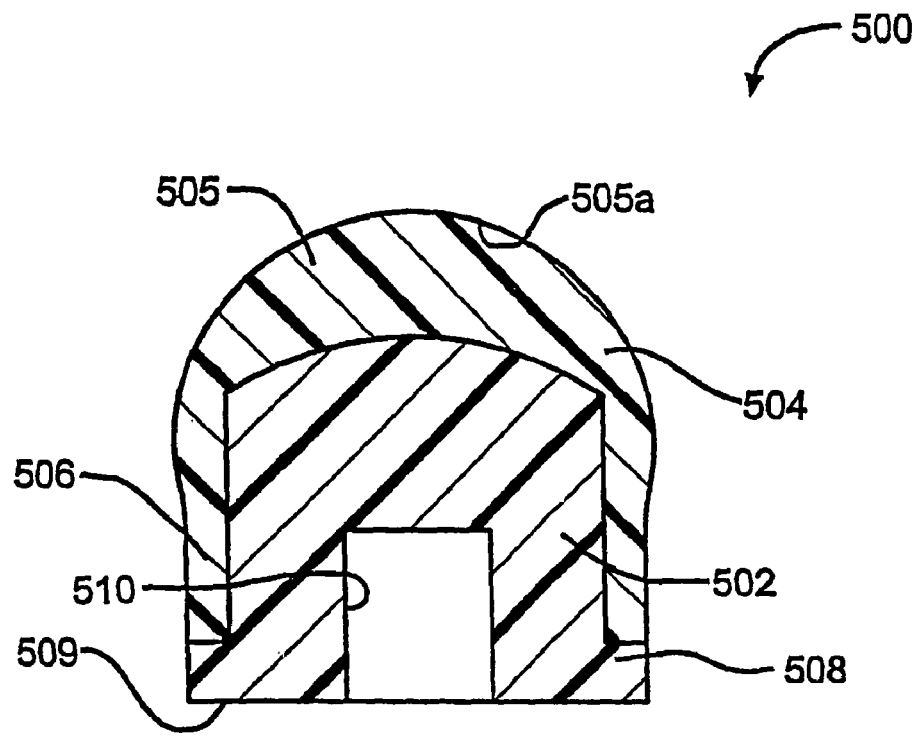
FIG. 11 is a view similar to FIG. 9, except showing an alternate embodiment of the gel cushion.

FIG. 11 is a cross sectional view of an alternate embodiment of the cushion of this invention, indicated generally at 500. The cushion 500 preferably has a generally cylindrical lower portion 502, and a generally cup-shaped upper portion 504. The upper portion 504 overlays and is bonded to a portion of the lower portion 502 that is disposed within the cup-shaped upper portion 504

The upper portion 504 includes a central portion 505 that may be generally described as convex-concave lens shaped, in that the central portion 505 is dished and increases in thickness toward the center of the central portion 505. The upper portion 504 includes an upper surface 505a. The upper surface 505a may be textured as is described in the embodiments illustrated in FIGS. 20 through 23. The upper portion 504 also includes a depending skirt portion 506 formed at the circumferential periphery of the central portion 505. The upper portion 504 may be made from any suitable material, such as a foam or a gel or a thermoplastic rubber. The material from which the upper portion 504 is formed is selected to have a relatively low hardness, so that the upper portion 504 is relatively soft and compliant. The upper portion 504 is preferably formed from a material like the suitable material described for the upper portion 404 of FIGS. 8 and 9, and will have a Shore A durometer of about 3 to about 10 when fully cured.

Figure 12:
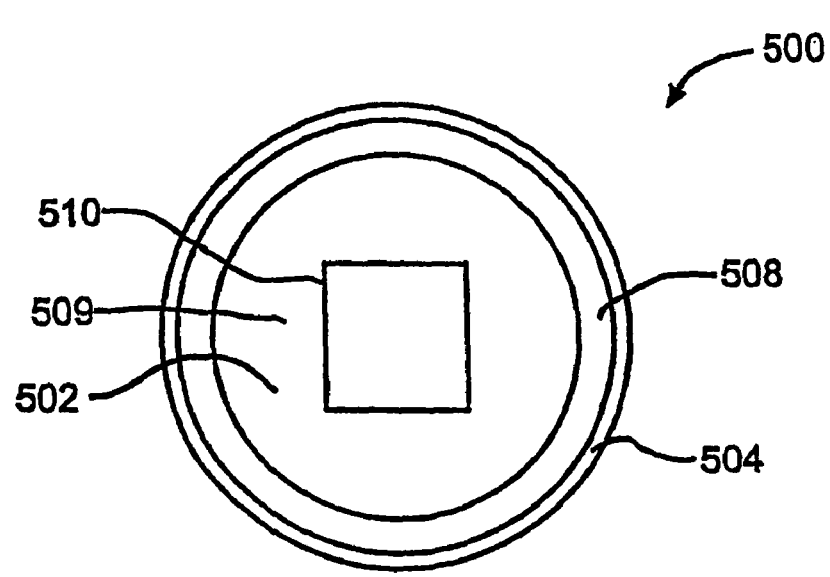
FIG. 12 is a bottom plan view of the gel cushion illustrated in FIG. 11.

As shown in FIGS. 11 and 12, the lower portion 502 is generally cylindrical and partially disposed within the depending skirt 506 of the upper portion 504. The lower portion 502 preferably includes a flange 508 that extends radially outwardly from a lower-most part of the lower portion 502. The depending skirt 506 abuts the flange 508, and is preferably bonded thereto. The lower portion 502 has a lower surface 509. The lower surface 509 defines a pocket 510 in a central portion thereof. The pocket 510 is adapted to receive the upper end of a cursor control stick, such as the cursor control stick 10 (seen in FIGS. 1 and 2). Preferably, the pocket 510 (and indeed, any of the pockets described in this application as receiving a cursor control stick) is preferably sized to receive the cursor control stick with a stretch fit; the pocket 510 as formed is slightly smaller in cross-section than the cursor control stick. When installing the cushion 500 on a cursor control stick, the cursor control stick is forced into the pocket 510, which stretches the material of the lower portion 502 to accommodate the larger cross section of the cursor control stick. The resulting elastic forces hold the cushion 500 on the cursor control stick through friction, creating an elastic or stretch fit between the pocket 510 and the cursor control stick 10.

Figure 8:
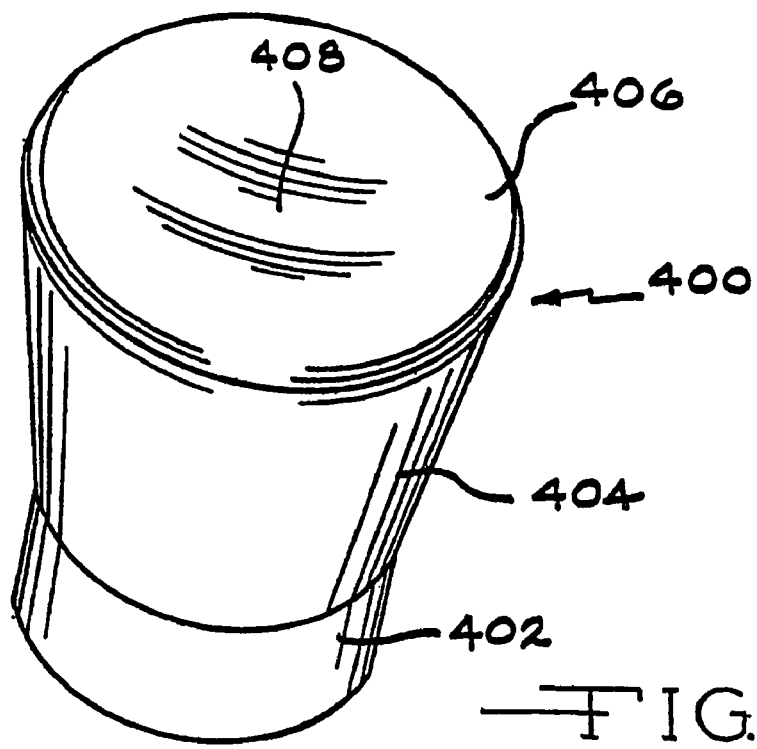
FIG. 8 is perspective view of a gel cushion for a keyboard cursor control stick.

The lower portion 502 is preferably formed of a material with a higher durometer than the upper portion 504, but the lower portion 502 may, nevertheless, be formed of any suitable material, such as the material described as suitable for the lower portion 402 of the cushion 400 illustrated in FIGS. 8 and 9.

Like the cushions described in the other embodiments in this application, the cushion 500 will deform if pressed against the display screen. It is contemplated that the cushion 500 may be manufactured to have a suitable relatively rigid pocket 510 (shown in FIGS. 11 and 12) to accept the upper end of a control stick of a computer, such as the control stick 10. It is also contemplated that the cushion 500 could otherwise be fixed to a control stick cap like the cap 18 in FIG. 2, such as by adhesively fixing the cushion 500 (with an appropriately shaped pocket 510) to such a control stick cap. It is also contemplated that the cushion 500 could be fixed to such a control stick cap by having a pocket 510, which is sufficiently deep to completely contain such a cap therein. In this embodiment, an inwardly extending flexible flange (not shown) of the lower portion 502 of the cushion 500 will resiliently extend under a portion of the cap after the cap is inserted into the pocket 510 to retain the control stick cap in the pocket 510. It is also contemplated that the cushion 500 may be manufactured to form an integral part of a removable control stick or portion of a control stick (not shown).

The cushion 500 may be formed by any suitable process on standard thermoplastic equipment. Thermoplastic rubber compounds or thermoplastic elastomeric compounds, for example, can be injection molded, extruded, blow molded and thermoformed with the efficiency and economy associated with such materials. In a preferred process, the cushion 500 is formed in a two step injection molding process, such as was described above with respect to the cushion 400 and illustrated in FIG. 23.

Figure 13:
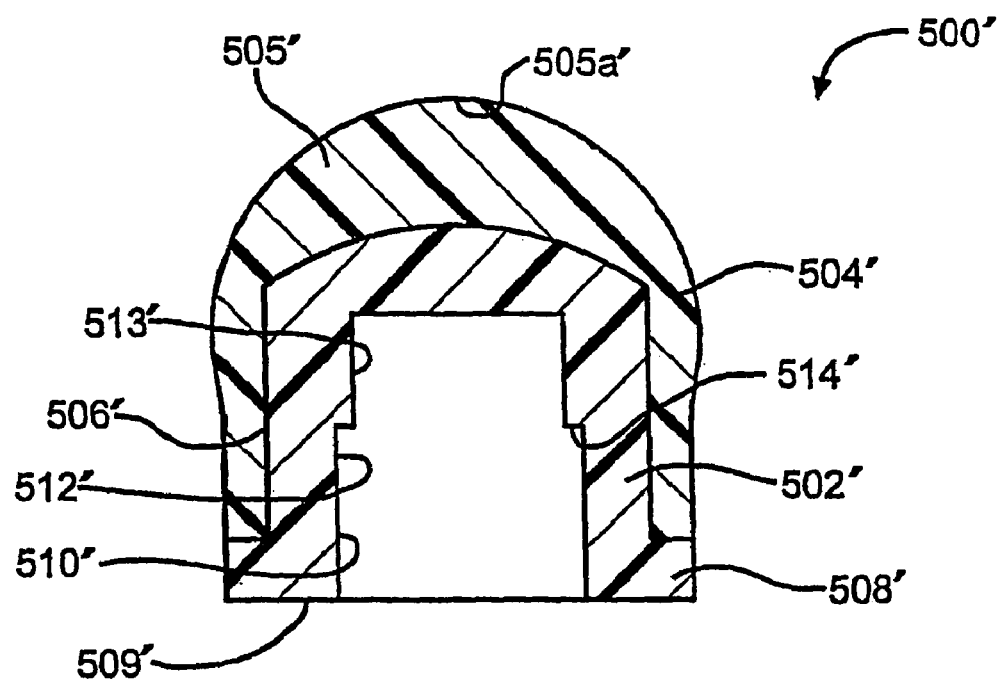
FIG. 13 is a view similar to FIG. 11, except showing an alternate embodiment of the gel cushion.
Figure 14:
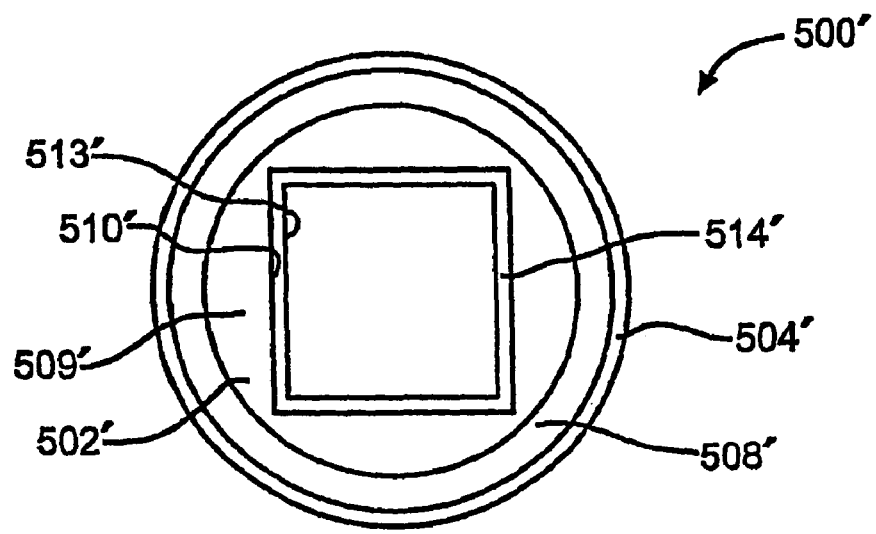
FIG. 14 is a bottom plan view of the gel cushion illustrated in FIG. 13.

An alternate embodiment of the cushion 500 is illustrated at 500' in FIGS. 13 and 14. The cushion 500' is similar in outer shape to the cushion 500 illustrated in FIG. 11, and has similar qualities of deformation for comfort and protection of computer video screens, and smoothness and tack for ergonomic reasons and may be constructed of similar material as the cushion 500. However the cushion 500' is constructed somewhat differently, as will be described.

Like the cushion 500, the cushion 500' preferably has a generally cylindrical lower portion 502' and a generally cup-shaped upper portion 504'. The upper portion 504' may have a structure and composition identical to the upper portion 504 described above. The upper portion 504' includes an upper surface 505a'. The upper surface 505a' may be textured as is described in the embodiments illustrated in FIGS. 20 through 23.

The lower portion 502' of the cushion 500' may be formed of any suitable material. Like the cushion 500, the lower portion 502' is preferably formed of a thermoplastic rubber compound such as SANTOPRENE® thermoplastic rubber with a formulation that cures to a Shore A durometer above 55. The lower portion 502' has a lower surface 509'. The lower surface 509' defines a pocket 510' in a central portion thereof. The pocket 510', like the pocket 510 in the cushion 500, is shaped to receive the upper end of a cursor control stick, such as the cursor control stick 10. In the illustrated embodiment the pocket 510 is rectilinear, having a rectangular cross section adapted to receive a control stick with a rectangular cross-section.

Figure 15:
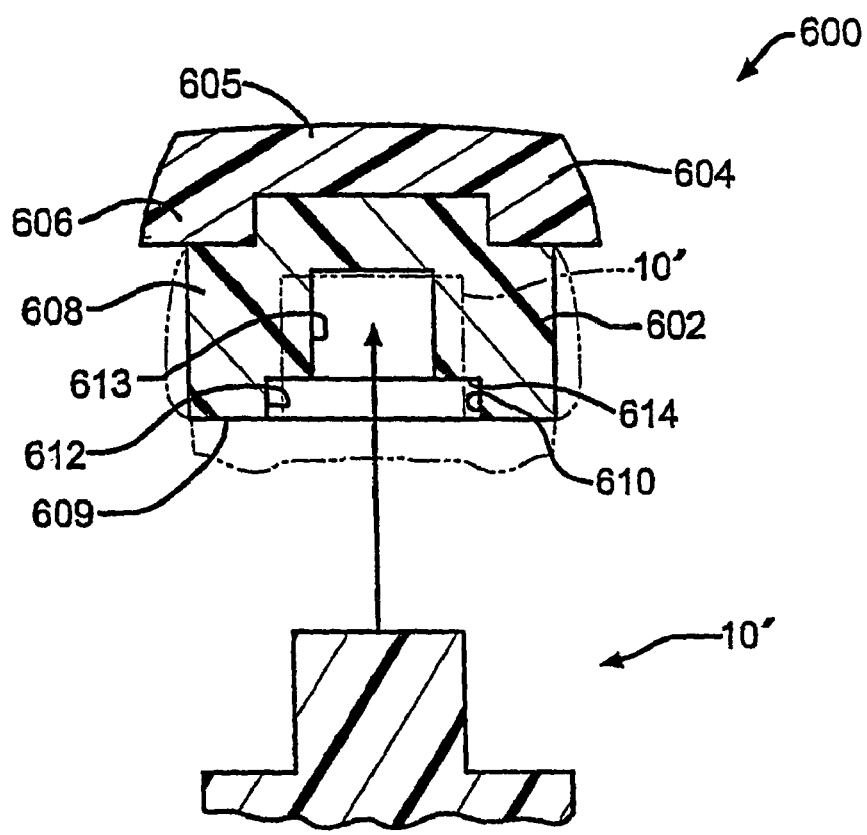
FIG. 15 is a view similar to FIG. 11, except showing an alternate embodiment of the gel cushion and with stick guide.
Figure 16:
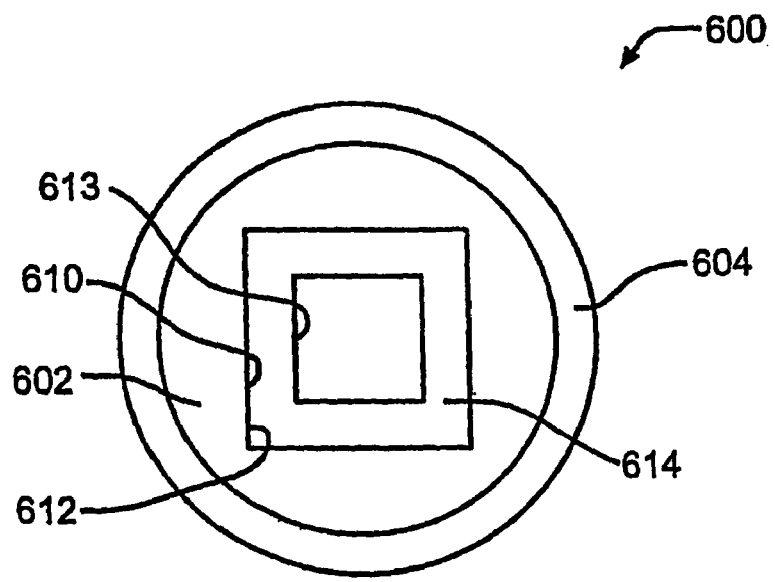
FIG. 16 is a bottom plan view of the gel cushion illustrated in FIG. 15.

The pocket 510' of the cushion 500' is of somewhat different structure than that of pocket 510 of the cushion 500, being a stepped recess. A first recess 512' is defined in the interior end surface of the pocket 510' with slightly larger cross-section than that of a second recess 513'. A step 514' is thereby formed between the first recess 512' and the second recess 513'. As illustrated, a cursor control stick (not shown) does not engage the second recess 513' of the pocket 510', although such is not required. The second recess 513' creates a void of stiff material below the central portion 505'. The void gives the central portion 505' a softer feel to the user. An alternate embodiment of the cushion of this invention, indicated generally at 600, is shown in FIGS. 15 and 16. The cushion 600 preferably has a generally cylindrical lower portion 602, and a generally cup-shaped upper portion 604. The upper portion 604 overlays and is bonded to a portion of the lower portion 602 that is disposed within the cup-shaped upper portion 604.

The upper portion 604 includes a central portion 605 that is preferably flat in shape. The upper portion 604 also includes a depending skirt portion 606 formed at the circumferential periphery of the central portion 605. The upper portion 604 may be made from any suitable material, such as a foam or a gel or a thermoplastic rubber or thermoplastic elastomeric compound. The material from which the upper portion 604 is formed is selected to have a relatively low hardness, so that the upper portion 604 is relatively soft and compliant. The upper portion 604 is preferably formed from a material like the suitable material described for the upper portion 404 of the cushion 400 illustrated in FIGS. 8 and 9.

As shown in FIGS. 15 and 16, the lower portion 602 is generally cylindrical and partially disposed within the depending skirt 606 of the upper portion 604. The lower portion 602 preferably includes a relatively thick flange 608 that extends radially outwardly from a lower-most part of the lower portion 602. The depending skirt 606 abuts the flange 608, and is preferably bonded thereto. The lower portion 602 has a lower surface 609. The lower surface 609 defines a pocket 610 in a central portion thereof. The pocket 610 is a stepped recess, having a first recess 612 defined in the interior end surface of the pocket 610 with slightly larger cross-section than that of the second recess 613. A step 614 is thereby formed between the first recess 612 and the second recess 613. The pocket 610 is adapted to receive the upper end of a cursor control stick 10'. Preferably, the second recess 613 of the pocket 610 (and indeed, any of the pockets described in this application as receiving a cursor control stick) is sized with a cross-section greater than the cross-section of the cursor control stick 10', and the cross-section of the first recess 612 being slightly smaller than the cross-section of the cursor control stick 10'. During the installation of the cushion 600 on the cursor control stick 10', the cursor control stick 10' is fitted into the pocket 610, with the upper end of the cursor control stick 10' engaging the step 614, the cushion 600 is thereby roughly aligned with the cursor control stick 10'. The cushion 600 is then pushed downwardly onto the cursor control stick 10', driving the cursor control stick 10' relatively upwardly into the second recess 613, to engage the walls of the second recess 613 with a stretch fit; in the same manner described above for the pocket 510 of the cushion as illustrated in FIG. 11. As is indicated in the phantom view, when the cursor control stick 10 is received in the pocket 610, the lower portion 602 of the cushion 600 may be slightly deformed as a result of the stretching as shown.

The lower portion 602 is preferably formed of a material with a higher durometer than the upper portion 604, but the lower portion 602 may, nevertheless, be formed of any suitable material, such as the material described as suitable for the lower portion 402 illustrated in FIGS. 8 and 9.

Like the cushions described in the other embodiments in this application, the cushion 600 will deform if pressed against the display screen. As discussed above, it is contemplated that the cushion 600 may be manufactured to have a suitable relatively rigid pocket 610 (shown in FIGS. 15 and 16) to accept the upper end of the control stick 10. It is also contemplated that the cushion 600 could otherwise be fixed to a control stick cap like the control stick cap 18 illustrated in FIG. 2, such as by adhesively fixing the cushion 600 (with an appropriately shaped pocket 610 to such a control stick cap. It is also contemplated that the cushion 600 could be fixed to such a control stick cap by having a pocket 610, which is sufficiently deep to completely contain such a cap therein. The lower portion 602 of such a cushion 600 could have an inwardly extending flexible flange (not shown) which would resiliently extend under a portion of the cap after the cap is inserted into the pocket 610 to retain the control stick cap in the pocket 610. It is also contemplated that the cushion 600 may be manufactured to form an integral part of a removable control stick or portion of a control stick (not shown).

The cushion 600 may be formed by any suitable process on standard equipment. Thermoplastic rubber compounds and thermoplastic elastomeric compounds, for example, can be injection molded, extruded, blow molded and thermoformed with the efficiency and economy associated with thermoplastic materials. In a preferred process, the cushion 600 is formed in a two step injection molding process, as was described above with respect to the cushion 400 and FIG. 23.

Figure 17:
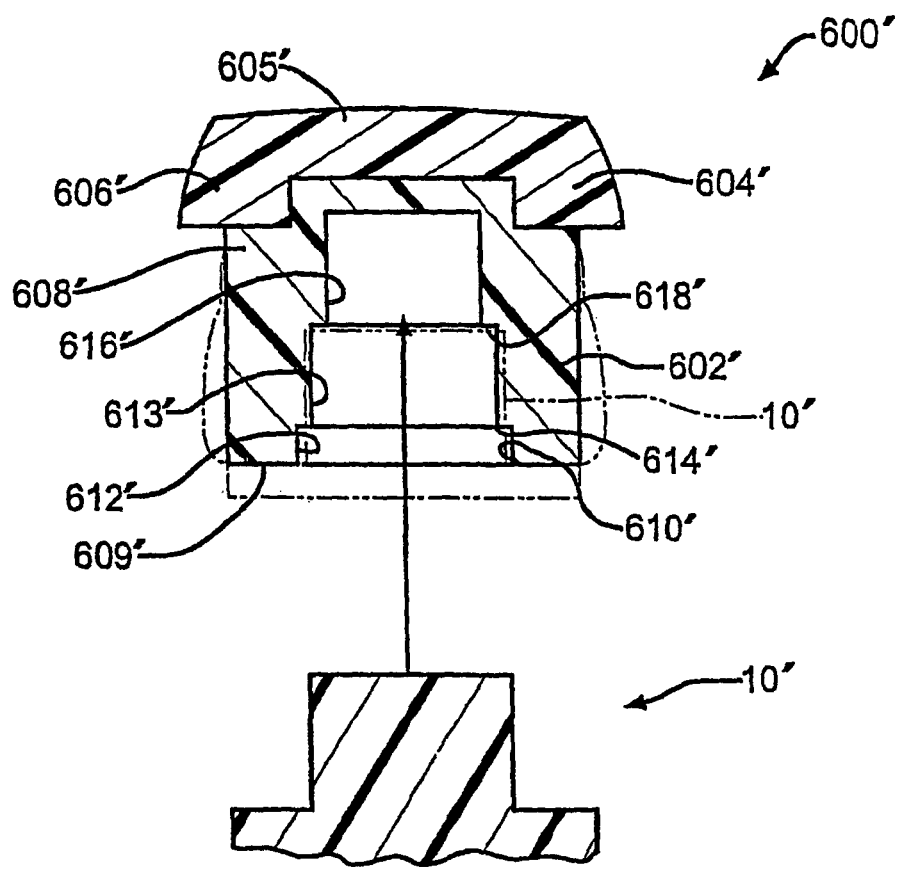
FIG. 17 is a view similar to FIG. 13, except showing an alternate embodiment of the gel cushion and with stick guide.
Figure 18:
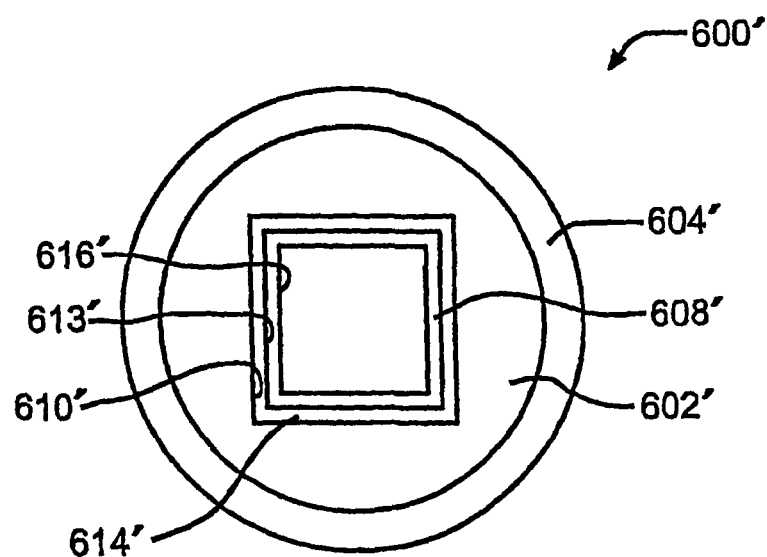
FIG. 18 is a bottom plan view of the gel cushion illustrated in FIG. 17.

An alternate embodiment of the cushion 600 is illustrated at 600' in FIGS. 17 and 18. The cushion 600' is similar in outer shape to the cushion 600 illustrated in FIG. 15, and has similar qualities of deformation for comfort and protection of computer video screens, and smoothness and tack for ergonomic reasons and may be constructed of similar material as the cushion 600. However the cushion 600' is constructed somewhat differently, as will be described.

Like the cushion 600, the cushion 600' preferably has a generally cylindrical lower portion 602' and a generally cup-shaped upper portion 604'. The upper portion 604' may have a structure and composition identical to the upper portion 604 described above. However, the upper portion 604' may include a flange portion 611'. The flange portion 611' extends radially outwardly from the upper portion 604'.

The lower portion 602' of the cushion 600' may be formed of any suitable material. Like the cushion 600, the lower portion 602' is preferably formed of a thermoplastic rubber compound such as SANTOPRENE® thermoplastic rubber with a formulation that cures to a Shore A durometer above 55. The lower portion 602' has a lower surface 609'. The lower surface 609' defines a pocket 610' in a central portion thereof. The pocket 610', like the pocket 610 in the cushion 600, is shaped to receive the upper end of a cursor control stick, such as the cursor control stick 10'. In the illustrated embodiment the pocket 610' has a rectangular cross section adapted to receive the cursor control stick 10' which has a rectangular cross-section.

The pocket 610' of the cushion 600' is of somewhat different structure than that of pocket 610 of the cushion 600, being a two-stepped recess. A first recess 612' defined in the interior surface of the pocket 610' with slightly larger cross-section than that of second first recess 613'. A step 614' is thereby formed between the first recess 612' and the second recess 613'. A third recess 616' with a slightly smaller cross-section than that of the second recess 613' is defined in the interior end surface of the pocket 610'. A step 618' is thereby formed between the second recess 612' and the third recess 616'. During the installation of the cushion 600' on the cursor control stick 10', the cursor control stick 10' is fitted into the pocket 610', with the upper end of the cursor control stick 10' engaging the step 614', the cushion 600' is thereby roughly aligned with the cursor control stick 10'. The cushion 600' is then pushed downwardly onto the cursor control stick 10', driving the cursor control stick 10' relatively upwardly into the second recess 613', to engage the walls of the second recess 613' with a stretch fit; in the same manner described above for the pocket 510 of the cushion as illustrated in FIG. 11. As is indicated in the phantom view, when the cursor control stick 10 is received in the pocket 610', the lower portion 602' of the cushion 600' may be slightly deformed as a result of the stretching as shown. As illustrated, the cursor control stick 10' does not engage the third recess 616' of the pocket 610', although such is not required. The third recess 616' creates a void of stiff material below the central portion 605'. This void gives the central portion 605' a soft feel to the user similar to the soft feel of the central portion 505', without having the thickness of soft material of the central portion 505'.

Figure 19:
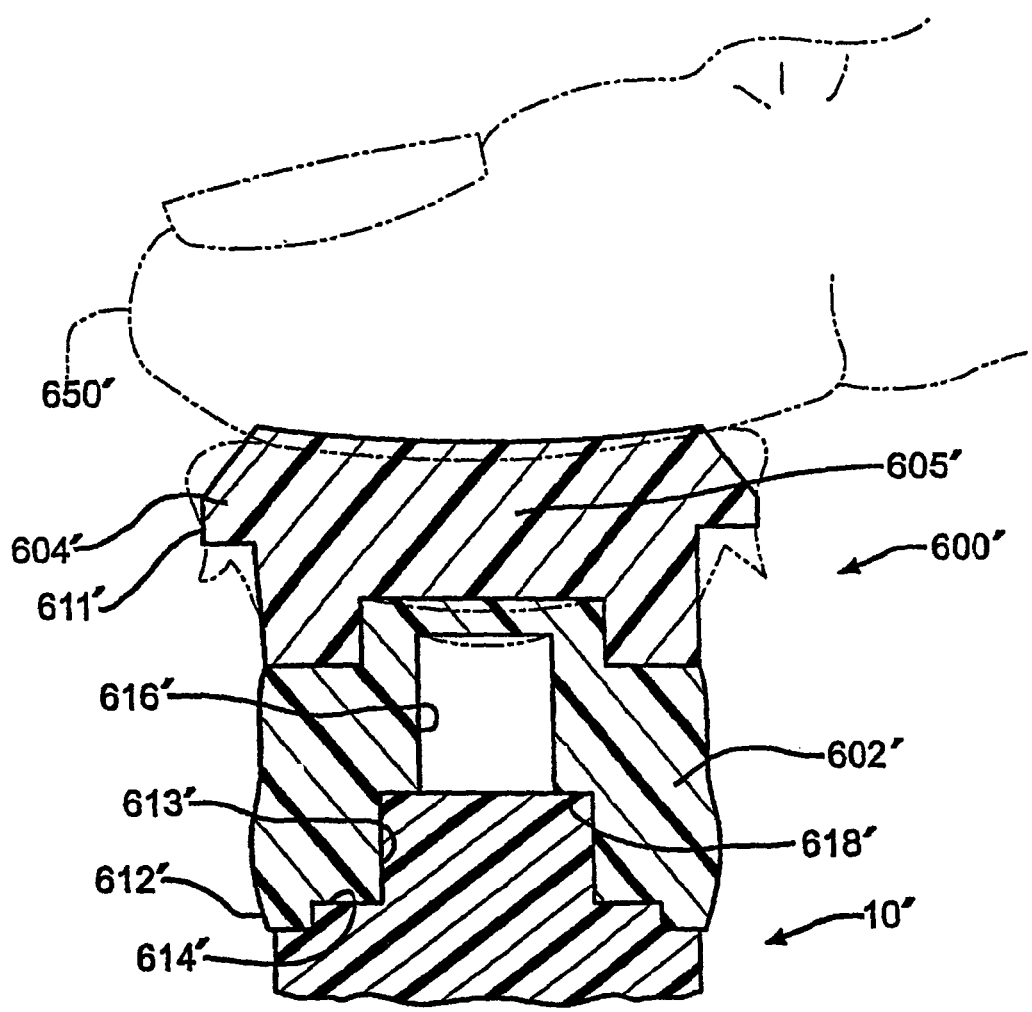
FIG. 19 is a view similar to FIG. 16, with the gel cushion deformed under the pressure of a user's finger.

As is illustrated in FIG. 19, the cursor control stick 10' is received in the pocket 610' of the cushion 600. The lower portion 602 of the cushion 600 may deform as shown when the cursor control stick 10' is received in the pocket 610. As is also indicated in the phantom view, the cushion 600 may deform under the pressure of a user's finger 650.

In some applications it may be desirable to provide a textured surface on the cap. Any suitable texture pattern may be provided. Raised nubs and raised ridges are among the patterns which may be suitable.

Figure 20:
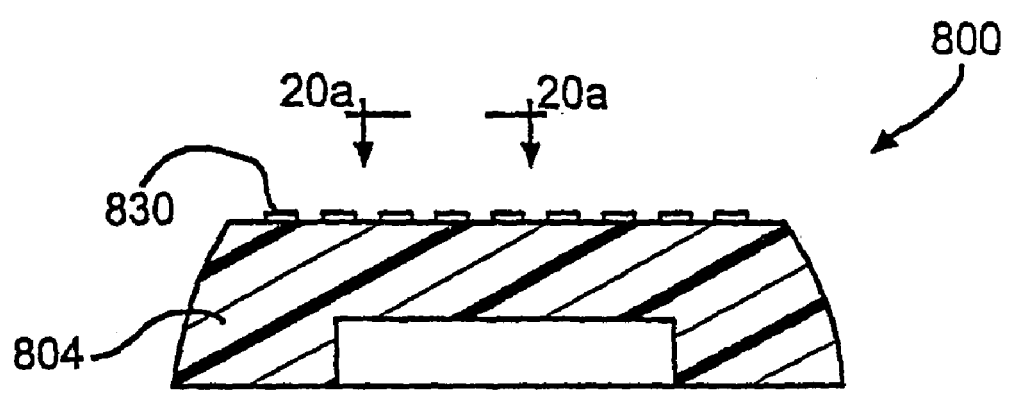
FIG. 20 is a cross sectional view of the cushioned cap illustrated in FIG. 18.
Figure 20A:
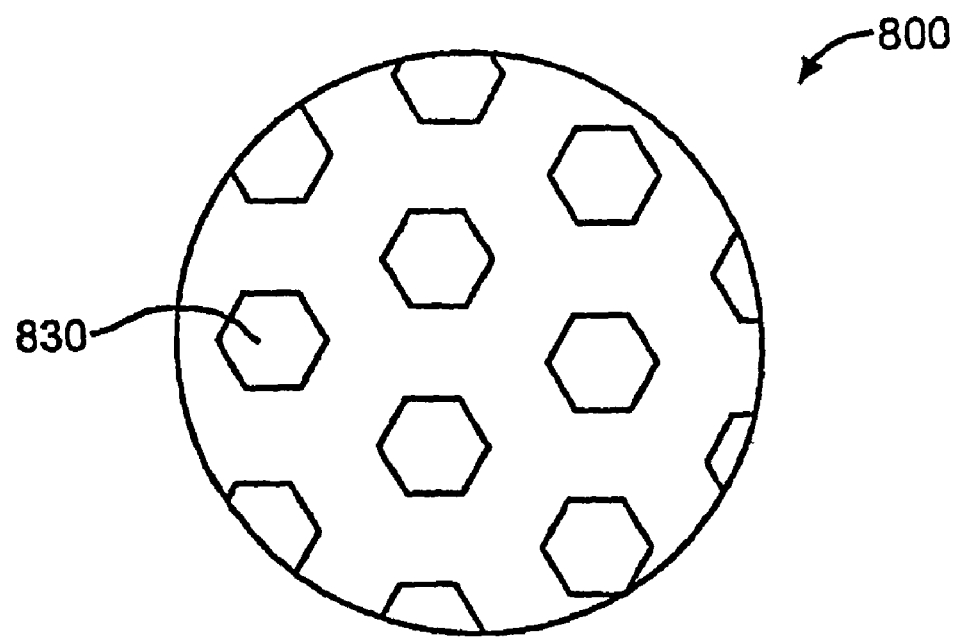

Referring now to FIGS. 20 and 20a, an alternative embodiment of an upper portion 804 of the cushion of this invention, indicated generally at 800, is shown. FIG. 20a is an enlarged plan view of a portion of the upper portion 804 illustrated in FIG. 20. The upper portion 804 of the cushion 800 has a top surface containing one or more nubs 830. The nubs 830 may be of any suitable height. However, in one preferred embodiment the nub height is 0.5 millimeters to 1.0 millimeter. As illustrated, the nubs 830 are hexagonal in shape, but it is to be understood that the nubs may be any shape and may be spaced in any configuration. Without excluding circular nubs from the scope of the invention, it is believed that having side walls of the nubs 830 extend at right angles from the upper surface of the upper portion 804 (as shown in FIG. 20) will provide a more non-slip surface, while the relatively soft material of the upper portion 804 will help keep the cushion 800 from irritating the finger of a user. The nubs 830 are spaced from about 0.5 millimeters to about 1.0 millimeters on center and the nubs are about 0.5 millimeters to about 0.10 millimeters in width. Spacing the nubs 830 apart creates an open pattern texture. It is believed that the open pattern of the spaced-apart nubs 830 will make the cushion 800 relatively easy to keep clean and allows the user to maintain accuracy with the cursor control stick.

Figure 21A:
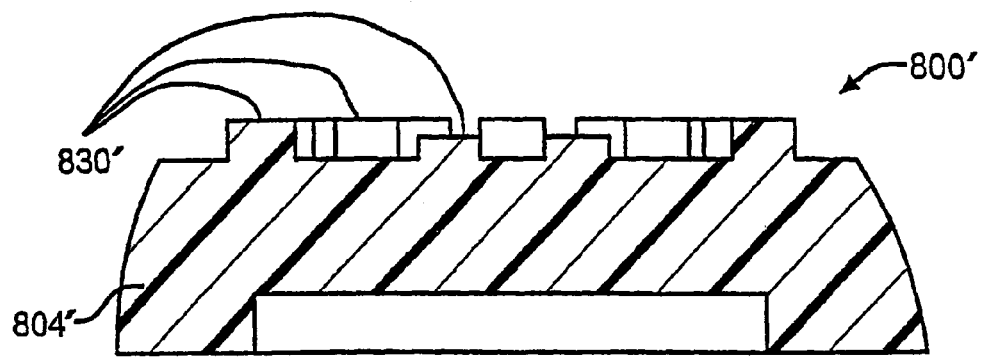
Figure 21:
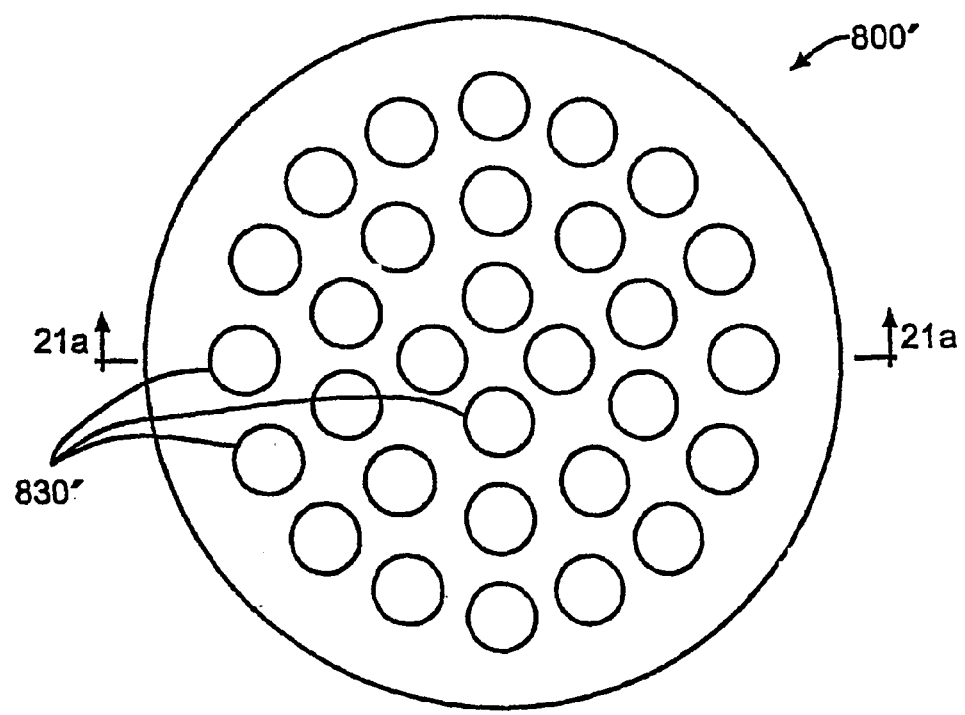
FIG. 21 is a plan view of an upper portion of another embodiment of the cushioned cap.

Referring now to FIGS. 21 and 21a, an alternative embodiment of an upper portion 804' of the cushion of this invention, indicated generally at 800', is shown. FIG. 21 is a plan view of an upper portion of the cushioned cap. FIG. 21a is a sectional view of the upper portion shown in FIG. 21, taken along the line 21a-21a. The upper portion 804' of the cushion 800' has a top surface containing one or more nubs 830'. The nubs 830' may be of any suitable height and may be of different heights from one another. However, in one preferred embodiment the nub height is about 0.25 millimeters to about 1.0 millimeter. As illustrated, the nubs 830' are round in shape, but it is to be understood that the nubs may be any shape and may be spaced in any configuration. Without excluding rounded nubs from the scope of the invention, it is believed that having side walls of the nubs 830' extend at right angles from the upper surface of the upper portion 804' (as shown in FIG. 21) will provide a more non-slip surface, while the relatively soft material of the upper portion 804' will help keep the cushion 800' from irritating the finger of a user. The nubs 830' are spaced from about 0.25 millimeters to about 1.0 millimeters on center and the nubs are about 0.5 to about 1.0 millimeters in width. Spacing the nubs 830' apart creates an open pattern texture. It is believed that the open pattern of the spaced-apart nubs 830' will make the cushion 800' relatively easy to keep clean and allows the user to maintain accuracy with the cursor control stick.

Figure 22:
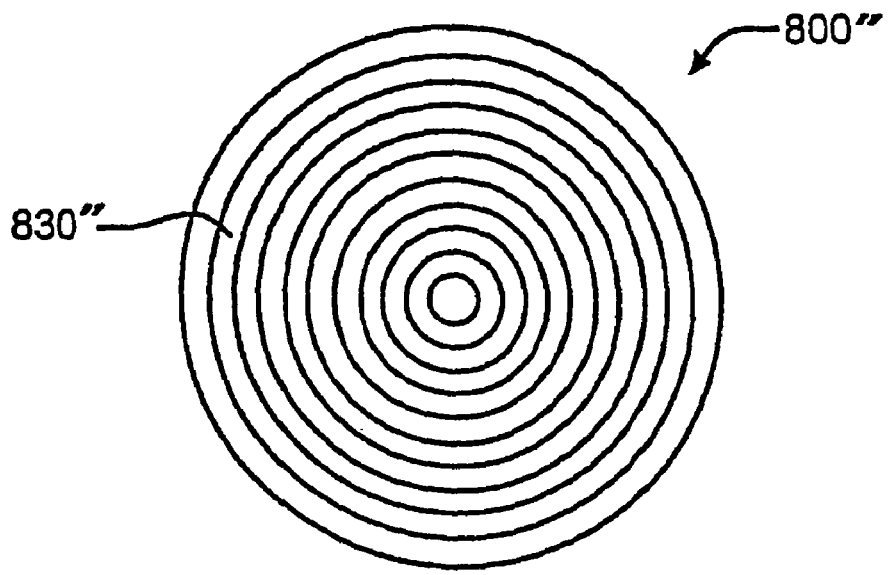
FIG. 22 is similar to FIG. 18, except showing an alternate embodiment of the textured surface.
Figure 23:
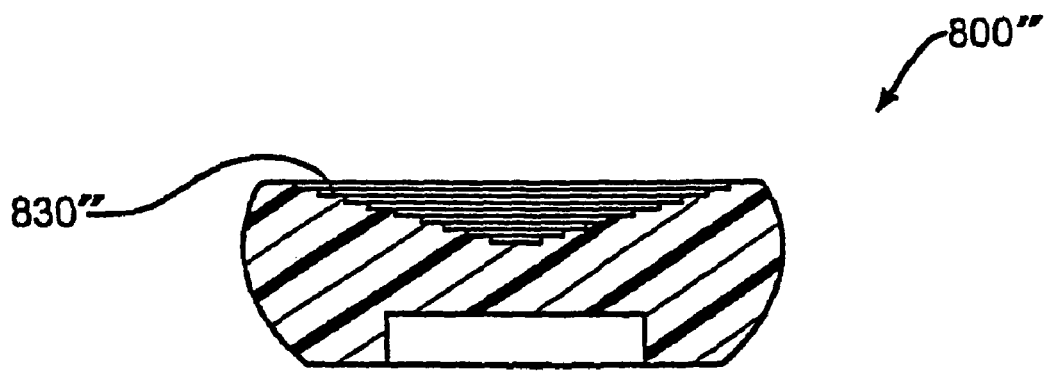
FIG. 23 is a cross sectional view of the cushioned cap illustrated in FIG. 22.
Figure 24:
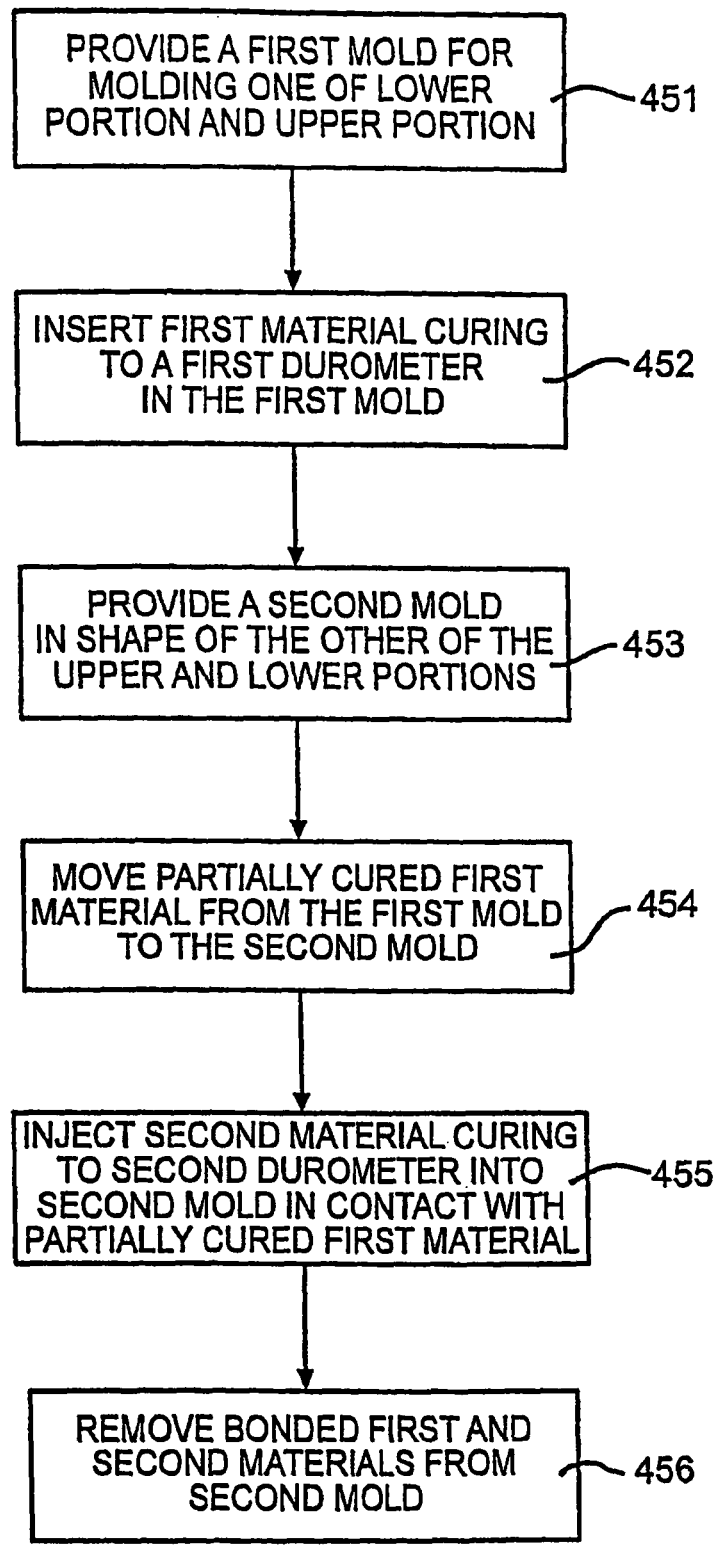
FIG. 24 is a flowchart illustrating a method of manufacturing a gel cushion in accordance with this disclosure.

Another alternate embodiment of an upper portion 804" of the cushion of this invention, indicated generally at 800", is shown in FIGS. 22 and 23. In this embodiment, the texture is provided in the form of concentric rings 830", each preferably having a rectangular cross-section.

Additionally, the upper portion 804" increases in thickness from the center of the upper portion 804" of the cushion 800" toward the circumferential periphery of the upper portion 804" of the cushion 800" as shown. The resulting upper portion of the cushion 800" is concave in shape, as is shown in FIG. 23. This concave shape may be considered another form of texture, and as illustrated, may be used in conjunction with other forms of texture, such as the concentric rings 830" (as shown in FIGS. 22, 23), or the nubs 830' (as shown in FIGS. 21, 21*a*), or the nubs 830 (as shown in FIGS. 20, 20*a*). Of course, concentric rings could be added to a flat or convex upper portion.

Referring now to FIGS. 25 through 39, there are illustrated various embodiments of cushioned caps in accordance with the present invention. The cushioned caps illustrated in FIGS. 35 through 39 are similar to the cushioned caps described in the previous embodiments of the invention and may have similar characteristics. Each of the cushioned caps has an upper portion and a lower portion. Each of the upper portions and the lower portions may be formed of the same material or may each be formed of different materials. The upper portions and the lower portions may be integrally formed. Each of the cushioned caps may have upper portions and lower portions that have the same or different durometers than one another when cured. The cushioned caps may be formed of any suitable material. Examples of some materials that may be suitable for the upper portion and lower portion of the cushioned caps illustrated in FIGS. 25 through 39 include (without excluding other materials) thermoplastic elastomer, thermoplastic elastomer olefin, thermoplastic elastomer polyolefin, Santoprene®, styrene maleic anhydride, Dylark®, polycarbonate, polypropylene, acrylonitrile butadiene styrene (ABS), polycarbonate acrylonitrile butadiene styrene, styrene maleic anhydride (SMA), polyphenylene oxide (PPO), nylon, polyester, acrylic, polysulfone, thermoplastic polyether, thermoplastic urethane, polypropylene, polyurethane, copolyester, thermoplastic styrenic elastomer, nylon, rubber, nitrile butadiene rubber (NBR) and any combination thereof. In a preferred embodiment, the cushioned caps are formed from a thermoplastic elastomer, such as the Starflex family of thermoplastic rubbers available from Star Thermoplastics and Alloys, Inc., Chicago, Ill., although such is not required. The cushioned caps illustrated in FIGS. 25 through 39 may also have any suitable textured surface and color.

Preferably, the material of the upper portions of each of the cushioned caps illustrated in FIGS. 25 through 39 has a durometer between about 10 to about 74 Shore A. More preferably the material of the upper portions of each of the cushioned caps illustrated in FIGS. 25 through 39 has a durometer of about 12 to about 74 Shore A. In a preferred embodiment, the material of the upper portions of each of the cushioned caps illustrated in FIGS. 25 through 39 has a durometer of about 12 to about 30 Shore A. Preferably, the material of the lower portions of each of the cushioned caps illustrated in FIGS. 25 through 39 has a durometer between about 80 to about 88 Shore A. More preferably the material of the lower portions of each of the cushioned caps illustrated in FIGS. 25 through 39 has a durometer of about 84 to about 85 Shore A. In an alternate embodiment, the upper portion and the lower portion of the cushioned caps have the same durometer.

In another preferred embodiment, the upper portions and the lower portions of each of the cushioned caps illustrated in FIGS. 25 through 39 are formed of the same material and the material has a durometer between about 60 to about 85 Shore A. In a further preferred embodiment, the material of the upper portions and lower portions of each of the cushioned caps illustrated in FIGS. 25 through 39 has a durometer of about 74 Shore A. It will be appreciated that the measurement of the durometer of the material of the cushioned caps may vary from the desired durometer by about 5 Shore A due to variations in molding and variations in durometer measurement techniques. It will be appreciated that the durometer of the material, the shape as described herein, and the surface shape and/or texture of the cushioned caps contribute to the overall desired feel of the cushioned caps.

The indications of measurements of the cushioned caps herein are general indications of the dimensions of the preferred embodiments of the cushioned caps. These general indications of dimensions of the cushioned caps are provided for reference only and are not intended to limit the cushioned caps of the invention to such dimensions. It will be appreciated that the various embodiments of the cushioned caps of the present invention may be practiced in any size with the elements thereof having any relative dimension to one another.

Figure 25:
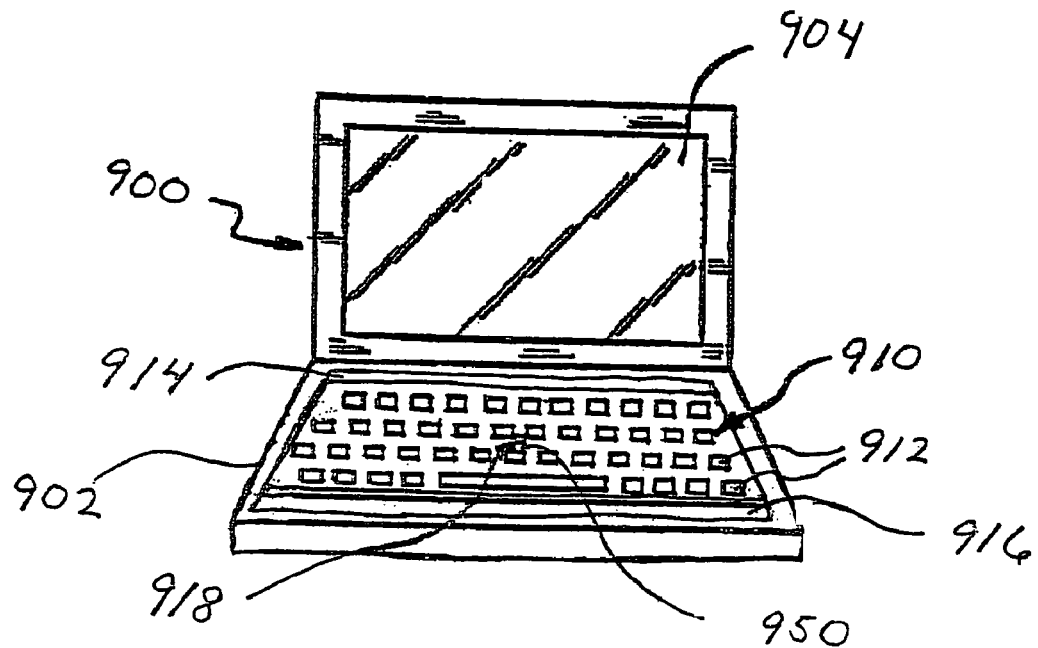
FIG. 25 is a perspective view of a computer, keyboard assembly, and an alternate embodiment of a cushioned cap in accordance with the present invention.
Figure 26:
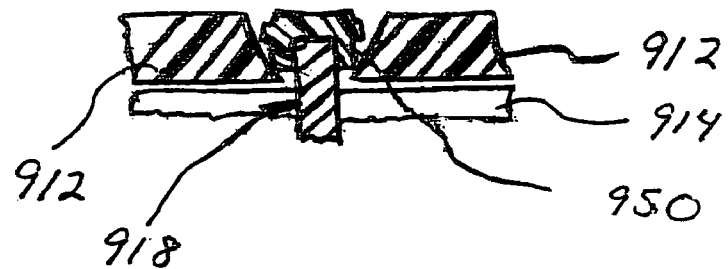
FIG. 26 is a cross sectional view of a portion of the keyboard assembly and cushioned cap illustrated in FIG. 25.
Figure 27:
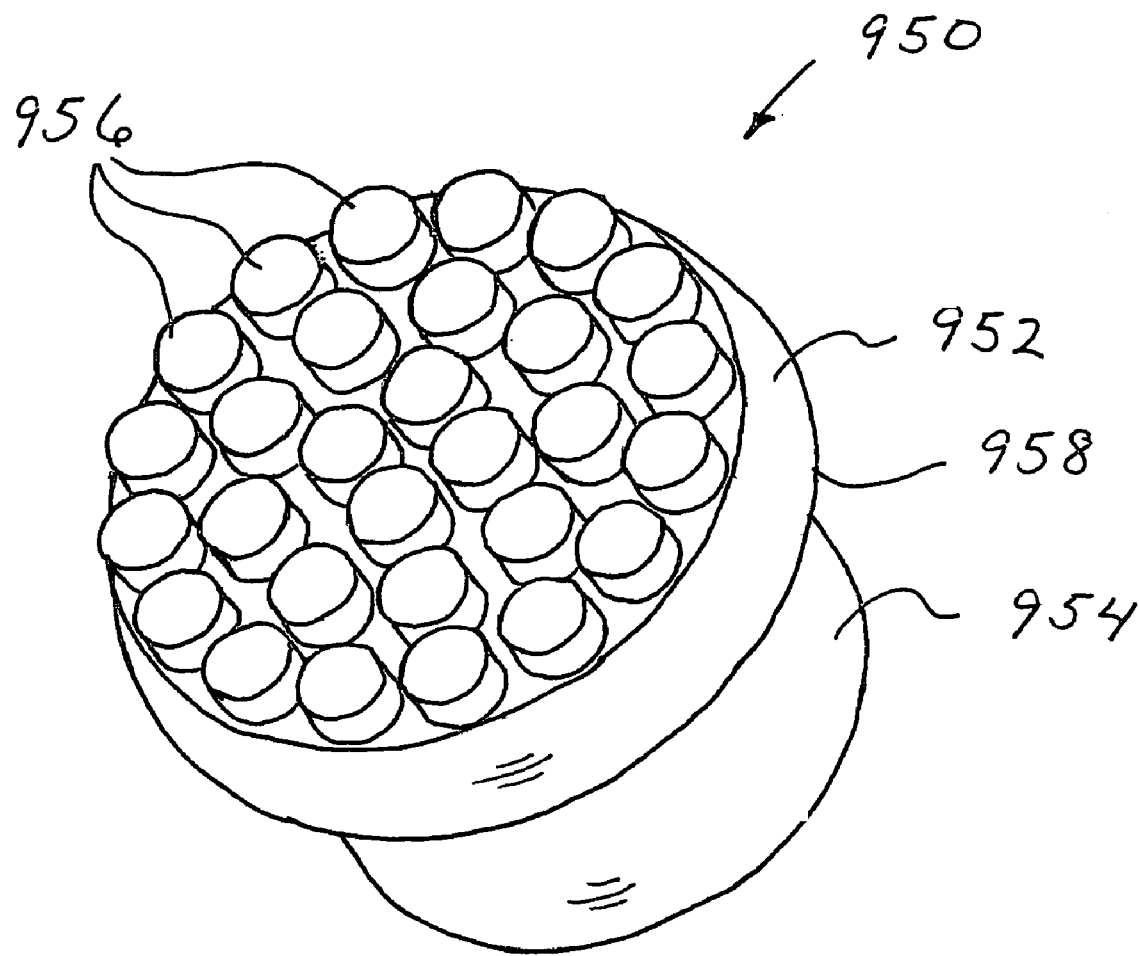
FIG. 27 is a perspective view of the cushioned cap illustrated in FIGS. 25 and 26.
Figure 28:
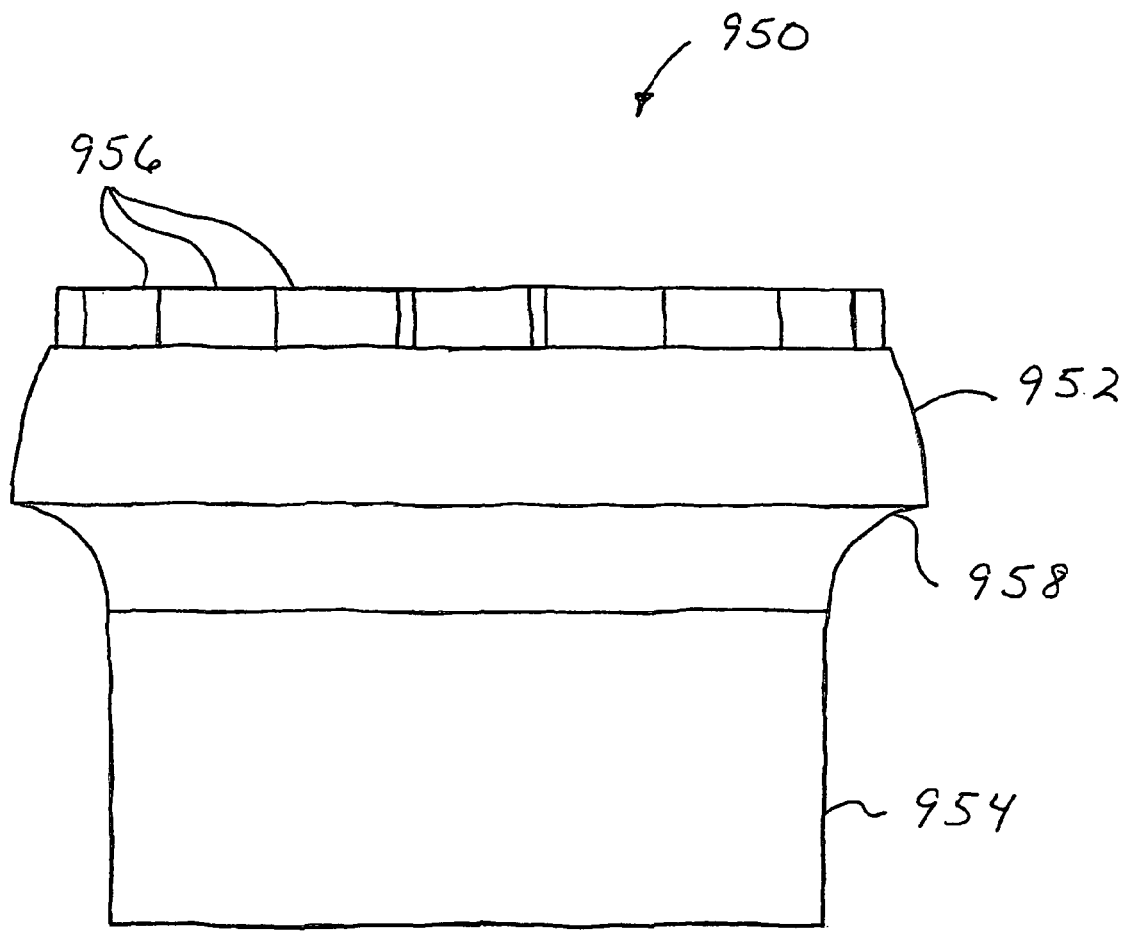
FIG. 28 is a side view of the cushioned cap illustrated in FIGS. 25 through 27.

Referring now to FIGS. 25 and 26, there is illustrated an embodiment of a laptop computer, indicated generally at 900, in accordance with the present invention. The computer 900 may include a housing 902 and a monitor or display 904. The computer 900 may include a keyboard assembly, indicated generally at 910, in accordance with the present invention. The keyboard assembly 910 may include a plurality of keys 912 and corresponding switches and logic circuitry, shown schematically at 914. The keyboard assembly 910 may further include a communications cable (not shown) to communicably connect the circuitry 914 to the laptop 900. The keyboard assembly 910 may further include a bezel 916 to facilitate placement and/or attachment of the assembly 910 within the housing 902 of the laptop 900, although such is not required. The keyboard assembly 910 may further include a control stick 918 and an alternate embodiment of a cushioned cap 950, in accordance with the present invention. The keyboard assembly 910 may further include other input devices (not shown) that facilitate the collection of input from a user in conjunction with or as an alternative to the control stick 918. For example, the keyboard assembly 910 may include a touch pad (not shown) in addition to the control stick 918 and a user may be able to use the control stick 918 and the touch pad as input devices to the laptop 900 simultaneously or alternatively.

It will be appreciated that the control stick 918 may be mounted to any electronic device, including but not limited to desktop computers, laptop computers, personal digital assistants, portable playback devices such as MP3 players, IPODS, and satellite radio receivers, voice recorders, cellular phones, cordless phones, inventory, freight, and parcel tracking handheld devices, and vehicular control consoles. The control stick 918 may be provided in combination with any other input devices such as keyboards and/or touch pads for an electronic device. The control stick 918 may be used in conjunction with at least one key (not shown) that alters the input behavior of the control stick 918 or the associated cursor function of the computer 900, such as conventional left and right mouse buttons, although such is not required. The control stick 918 may be integrated within the housing 916 of the computer 900 or the bezel 914 of the keyboard assembly 910, although such is not required.

Figure 29:
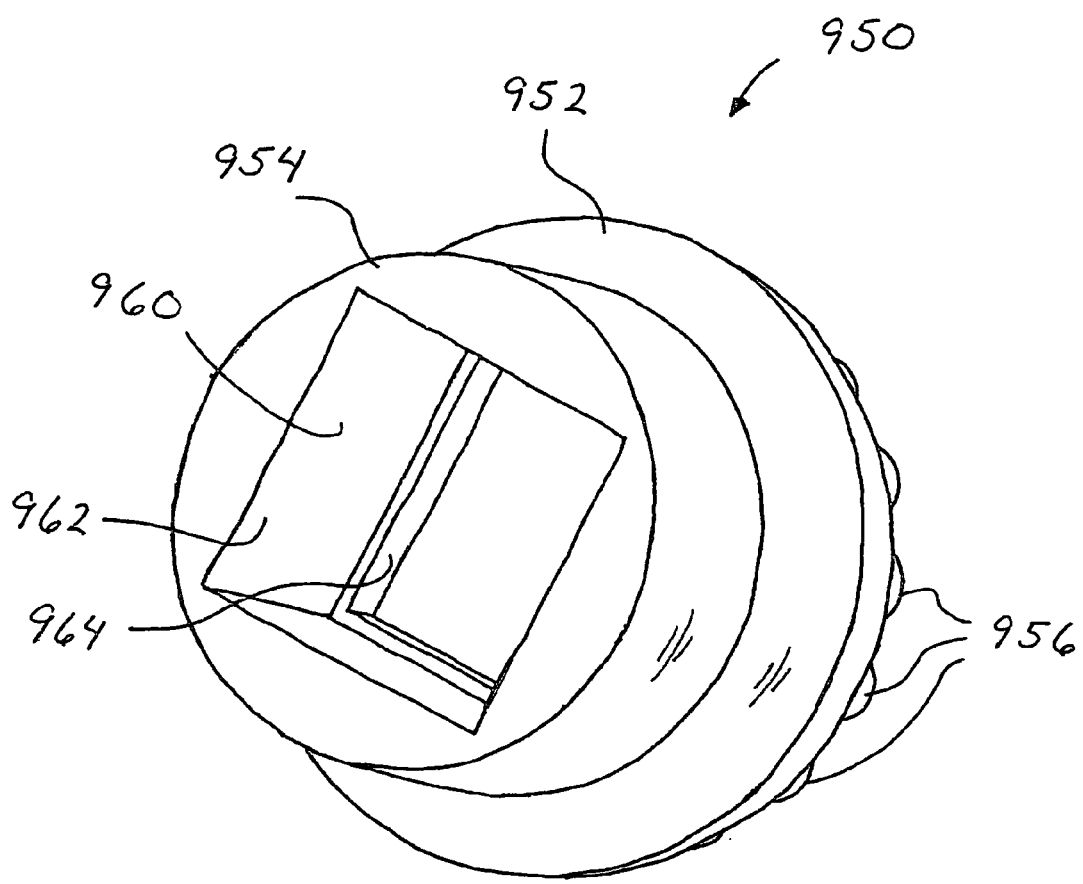
FIG. 29 is a perspective view of the cushioned cap illustrated in FIGS. 25 through 28.
Figure 30:
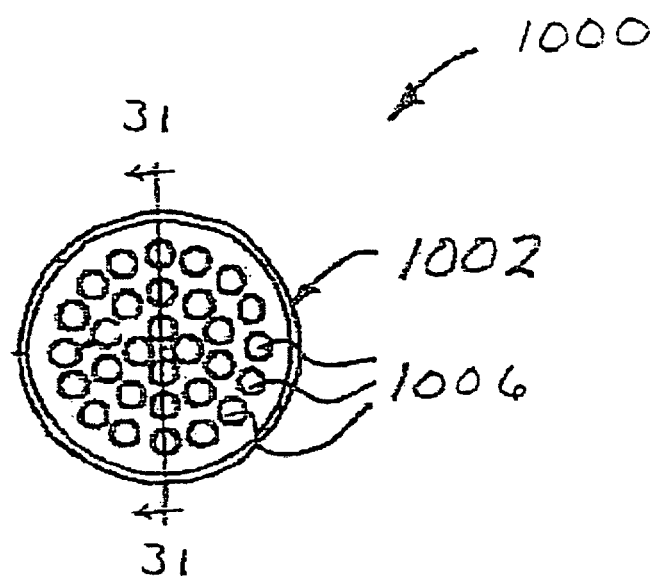
FIG. 30 is a top plan view of an alternate embodiment of a cushioned cap in accordance with the present invention.

The cushioned cap 950 may extend from the control stick 918 to any desired height relative to the keys 912. For example, as illustrated in FIG. 26, when the cushioned cap 950 and keys 912 are disposed for use on the computer 900, the cushioned cap 950 extends at a height that is relatively the same as the height of the keys 912. However, it will be appreciated that the cushioned cap 950 may be shaped to extend from the computer 900 at a height greater than, less than, or equal to the height of which the keys 912 extend from the computer 900. Therefore, the cushioned cap 950 may extend from the keyboard assembly 910 so that the cushioned cap 950 is taller, shorter, or the same height as the keys 912 in accordance with the present invention Referring now to FIGS. 27 through 29, the cushioned cap 950 includes an upper portion 952 and a lower portion 954. The upper portion 952 may include at least one nub 956. The upper portion 952 of the cushioned cap 950 may include a depending skirt portion 958, although such is not required. The lower portion includes a recess 960 being sized to accommodate at least a portion of a cursor control stick therein. The recess 960 may be a two-stepped recess having a lower portion 962 having a generally rectangular cross-section and an upper portion 964 having a cross-section that is generally rectangular and smaller in cross-section than the lower portion 962, as best shown in FIG. 29.

Figure 31:
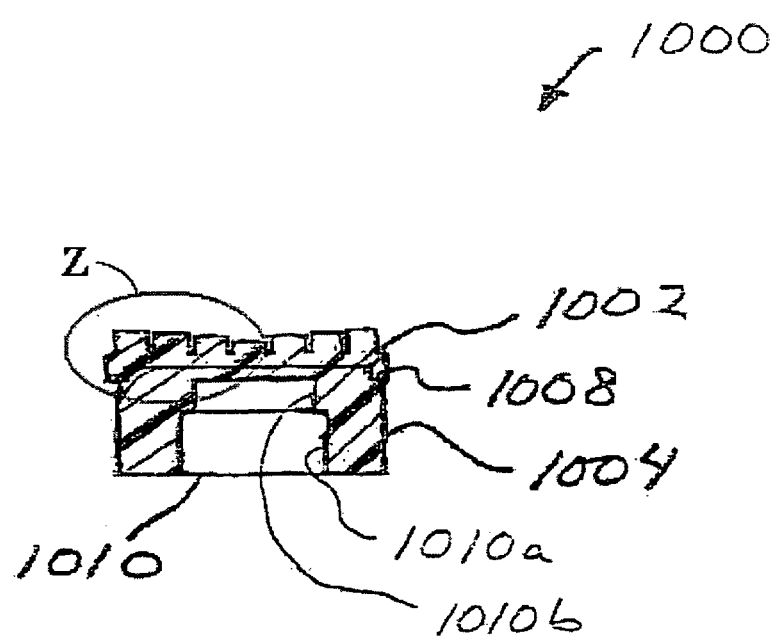
FIG. 31 is a cross sectional view of the cushioned cap illustrated in FIG. 30 taken along line 31-31.
Figure 32:
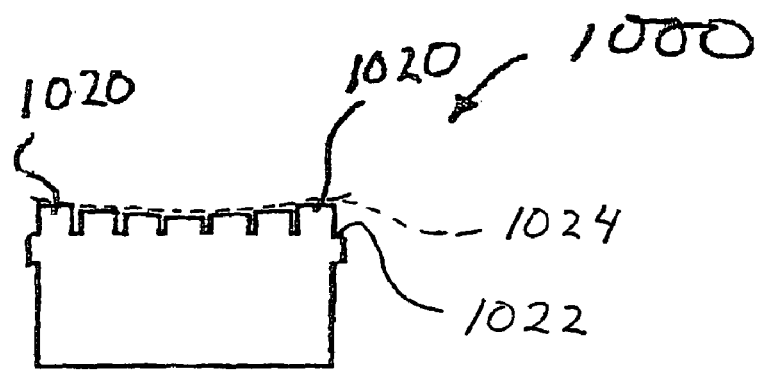
FIG. 32 is a side view of the cushioned cap illustrated in FIGS. 30 and 31.
Figure 33:
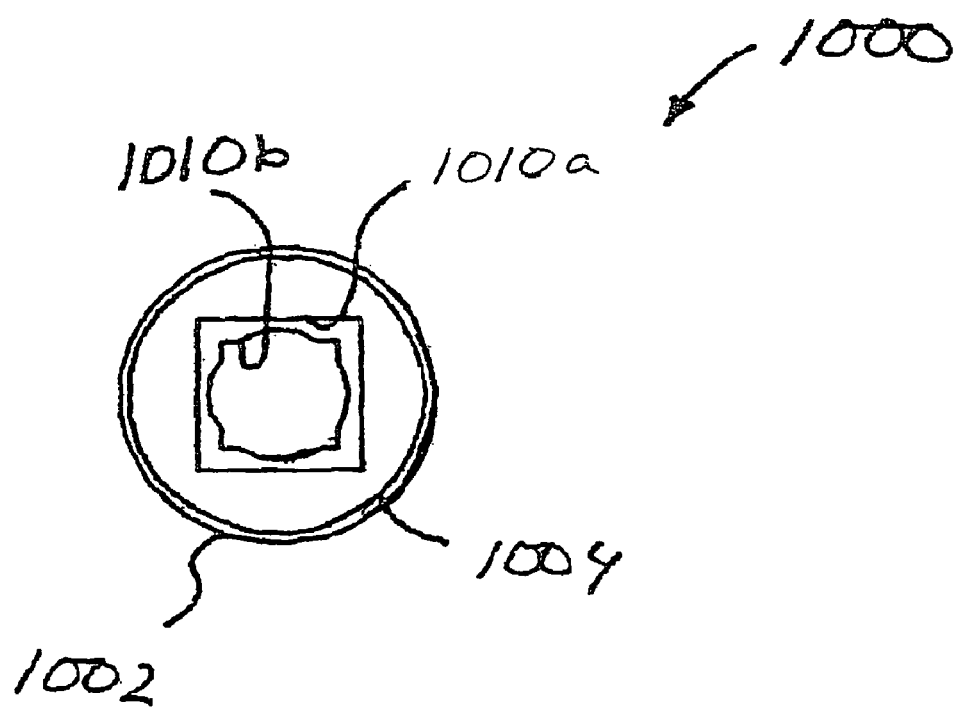
FIG. 33 is a bottom plan view of the cushioned cap illustrated in FIGS. 30 through 32.

Referring now to FIGS. 30 through 34 and 36 through 37, there is illustrated an alternate embodiment of a cushioned cap, indicated generally at 1000, in accordance with the present invention. The cushioned cap 1000 has an upper portion 1002 and a lower portion 1004. The upper portion 1002 may include at least one nub 1006. The upper portion 1002 of the cushioned cap 1000 may include a depending skirt portion 1008, although such is not required. The lower portion includes a recess 1010 being sized to accommodate at least a portion of a cursor control stick therein. The recess 1010 may be a two-stepped recess having a lower portion 1010a having a generally rectangular cross-section and an upper portion 1010b having a cross-section that is generally circular with four triangular equally spaced notches extending outwardly therefrom, as best shown in FIG. 33.

Figure 34:
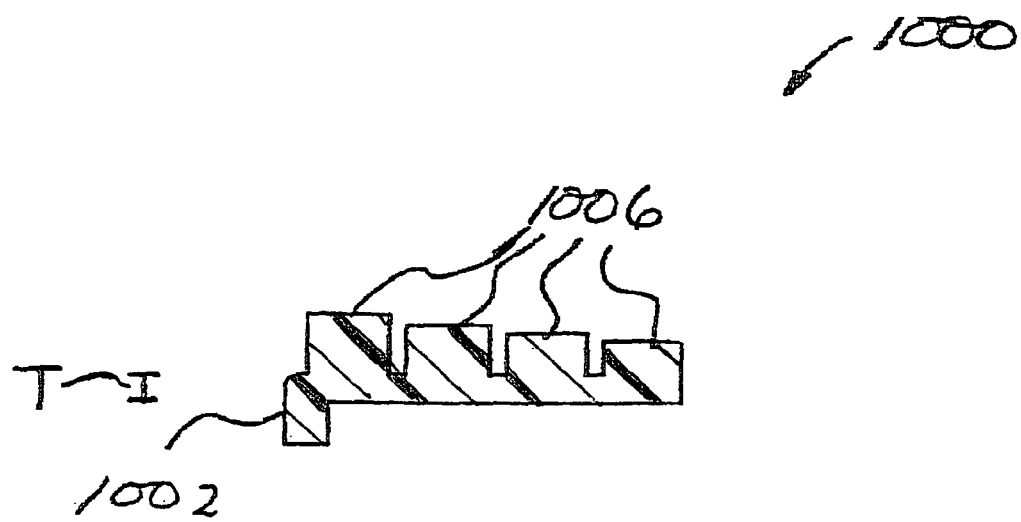
FIG. 34 is an enlarged sectional view of a part of the upper portion of the cushioned cap illustrated in FIGS. 30 through 33.

In a preferred embodiment, the upper portion 1002 has a thickness T, taken from an inner lower surface of the upper portion 1002 to an upper outer surface of the upper portion 1002, excluding the nubs 1006 of the upper portion 1002, of about 0.35 millimeters to about 0.65 millimeters, and more preferably has a thickness T of 0.55 millimeters, as shown in FIG. 34, which is an enlarged sectional view of the part of the upper portion of the cushioned cap indicated at "Z" in FIG 31.

In a preferred embodiment, the lower portion 1004 has a diameter of about 7.5 millimeters and an outer ring of nubs 1020 have a combined outer diameter of about 7.5 millimeters, as shown in FIG. 32. In a further preferred embodiment, the diameter of the lower portion 1004 and the combined diameter of the outer ring of nubs 1020 are the same to provide a user an added feeling of stability and/or stiffness in the at least one nubs 1006. In a preferred embodiment, each of the at least one nubs 1006 is provided on the upper portion 1002, such that none of the at least one nubs 1006 extends outwardly toward the outer perimeter of the upper portion 1002 further than the outer ring of nubs 1020.

As shown in FIGS. 31 and 32, the at least one nubs 1006 may be comprised of concentric rings of nubs of graduated heights that become shorter from the outer perimeter of the upper portion 1002 to the center of the upper portion 1002. The concentric rings of nubs of graduated heights provides a user the feel of a concave upper surface on the cushioned cap 1000. It will be appreciated that the cushioned cap 1000 has a generally flat upper surface 1022, although such is not required. The concentric rings of nubs of graduated heights may form a generally concave combined upper surface indicated at line 1024 in FIG. 32. In a preferred embodiment, the at least one nubs 1006 comprises four concentric rings of nubs, each of the nubs of each of the ring of nubs having heights of about 0.35 millimeters, about 0.45 millimeters, about 0.55 millimeters, and about 0.65 millimeters taken from the innermost ring of nubs to the outermost ring of nubs relative to the upper portion 1002. In another preferred embodiment, the at least one nubs 1006 comprises three concentric rings of nubs, each of the nubs of each of the ring of nubs having heights of about 0.5 millimeters, about 0.6 millimeters, and about 0.7 millimeters taken from the innermost ring of nubs to the outermost ring of nubs relative to the upper portion 1002.

Figure 35:
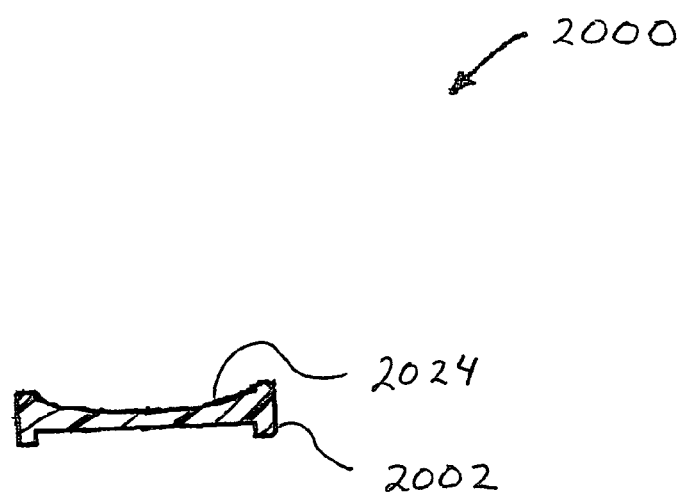
FIG. 35 is a sectional view of an alternate embodiment of an upper portion of a cushioned cap in accordance with the present invention.

An alternate embodiment of an upper portion of a cushioned cap, indicated generally at 2000, is illustrated in FIG. 35 in accordance with the present invention. The upper portion 2002 is similar to the upper portion 1002 except in that the upper portion 2002 does not contain a plurality of nubs. The upper portion 2002 has an upper surface 2024 that is generally concave. The upper portion 2002 may be provided in combination with any of the other cushioned cap elements and embodiments described herein in accordance with the present invention.

Figure 36:
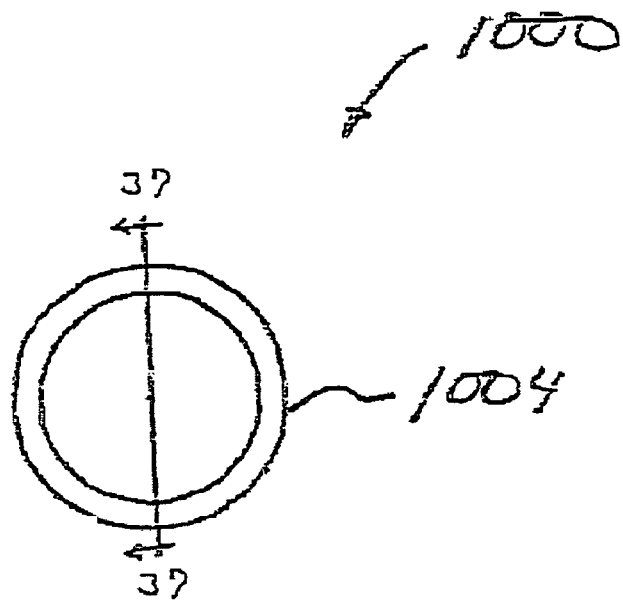
FIG. 36 is a top plan view of the lower portion of the cushioned cap illustrated in FIGS. 30 through 34.
Figure 37:
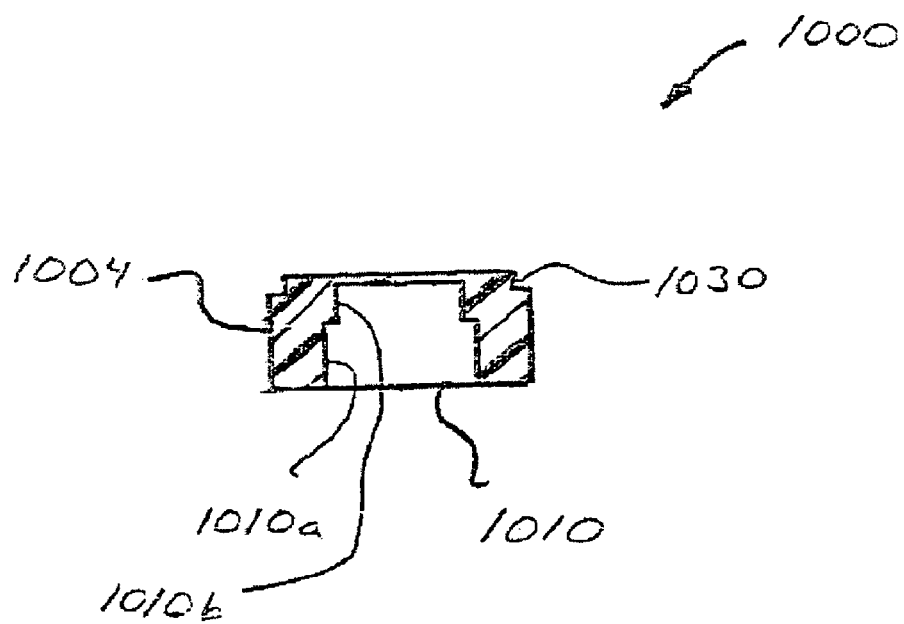
FIG. 37 is a cross sectional view of the lower portion of the cushioned cap illustrated in FIG. 36 taken along line 37-37.

Referring now to FIGS. 36 and 37, the lower portion 1004 of the cushioned cap 1000 is illustrated. The upper portion 1002 of the cushioned cap 1000 has been removed for clarity. The lower portion 1004 may include a recess 1030 extending about the periphery of a part of the lower portion 1004. The recess 1030 may assist in the attachment or formation of the upper portion 1002 and the lower portion 1004 to one another. It will be appreciated that the recess 1030 is not required to practice the invention.

Figure 38:
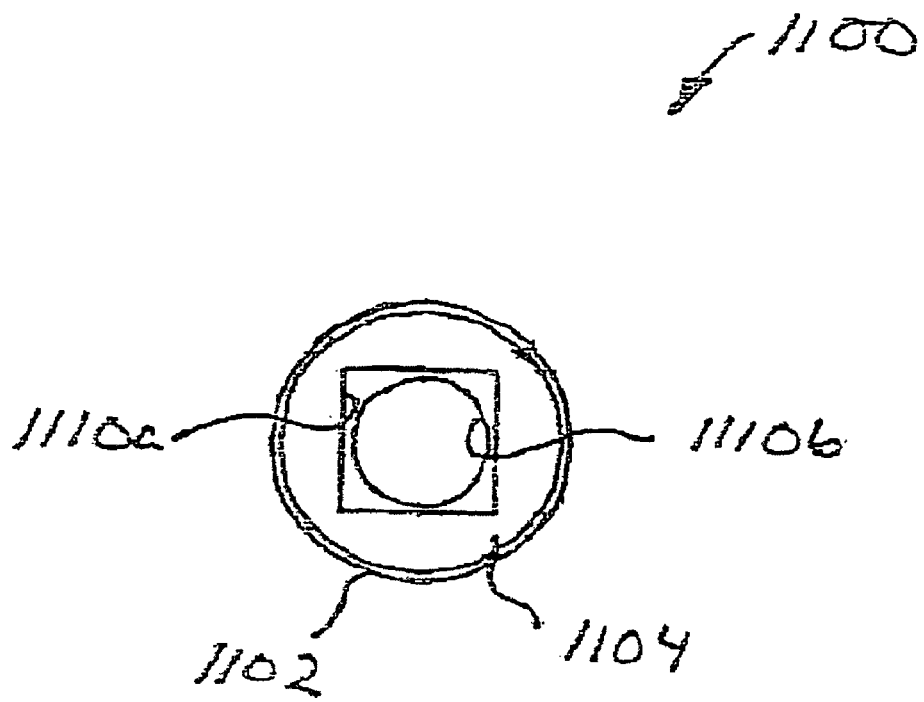
FIG. 38 is a bottom plan view of an alternate embodiment of a cushioned cap in accordance with the present invention.
Figure 39:
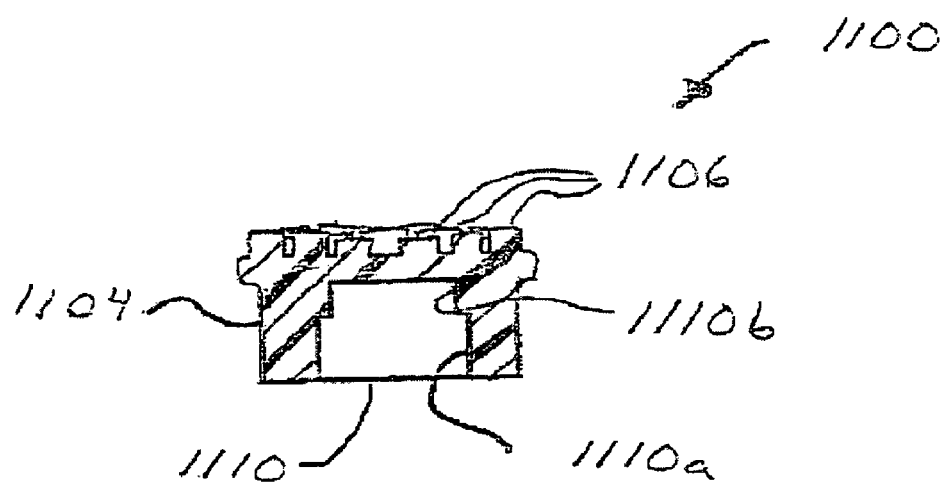
FIG. 39 is a sectional view of the cushioned cap illustrated in FIG. 38.

Referring now to FIGS. 38 and 39, there is illustrated an alternate embodiment of a cushioned cap, indicated generally at 1100, in accordance with the present invention. The cushioned cap 1100 has an upper portion 1102 and a lower portion 1104. The upper portion 1102 may include at least one nub 1106, although such is not required. The lower portion includes a recess 1110 being sized to accommodate at least a portion of a cursor control stick therein. The recess 1110 may be a two-stepped recess having a lower portion 1110a having a generally rectangular cross-section and an upper portion 1110b having a cross-section that is generally circular. It will be appreciated that the upper portion 1102 and the lower portion 1104 are formed integrally, although such is not required. It will further be appreciated that the upper portion 1102 and the lower portion 1104 may be formed of the same material, although such is not required.

The upper portion 1102 and the lower portion 1104 are formed of the same material and the material has a durometer between about 60 to about 85 Shore A. In a further preferred embodiment, the material of the upper portion 1102 and lower portion 1104 has a durometer of about 74 Shore A. It will be appreciated that the measurement of the durometer of the material of the cushioned caps may vary from the desired durometer by about 5 Shore A due to variations in molding and variations in durometer measurement techniques. It will be appreciated that the durometer of the material, the shape as described herein, and the surface shape and/or texture of the cushioned caps contribute to the overall desired feel of the cushioned caps.

Figure 40:
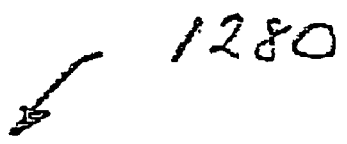
FIG. 40 is a side view of a portion of an alternate embodiment of a control stick in accordance with the present invention.
Figure 40:
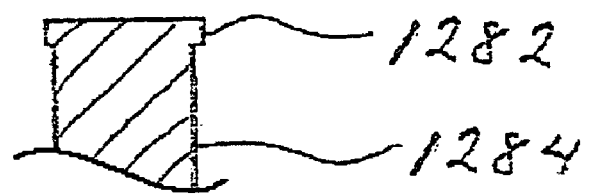

An alternate embodiment of a control stick, indicated generally at 1280, is illustrated in FIG. 40 in accordance with the present invention. The control stick 1280 is mounted at a first end (not shown) to a suitable computer. such as the laptop computer 900 (as shown in FIGS. 25 and 26). The second end of the control stick 1280 includes an upper portion 1282 and a lower portion 1284. Both the upper portion 1282 and the lower portion 1284 are generally circular in cross-section. The cushioned caps 950, 1000, 1100 are suitable for use with the control stick 1280. It will be appreciated that the respective recesses 960, 1010, 1110 each of the cushioned caps 950, 1000, 1100 may be shaped to engage the control stick 1280 in a stretch fit, such that the cushioned caps 950, 1000, 1100 are removably retained on the control stick 1280. Thus, the cushioned caps 950, 1000, 1100 are retained on the control stick 1280 during normal use of the control stick 1280, but may be removed from the control stick 1280 by exerting additional force beyond the force applied during normal use.

Figure 41:
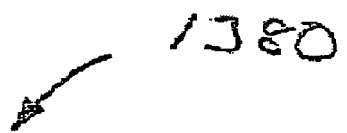
FIG. 41 is a side view of a portion of an alternate embodiment of a control stick in accordance with the present invention.
Figure 41:
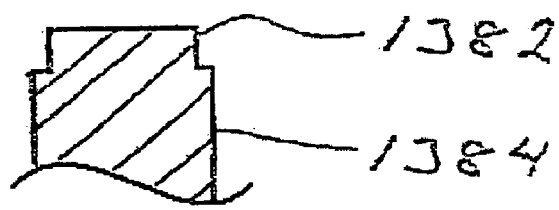

An alternate embodiment of a cursor control stick, indicated generally at 1380, is illustrated in FIG. 41 in accordance with the present invention. The control stick 1380 is mounted at a first end (not shown) to a suitable computer. such as the laptop computer 900 (as shown in FIGS. 25 and 26). The second end of the control stick 1380 includes an upper portion 1382 and a lower portion 1384. Both the upper portion 1382 and the lower portion 1384 are generally rectangular in cross-section. The cushioned caps 950, 1000, 1100 are suitable for use with the control stick 1380. It will be appreciated that the respective recesses 960, 1010, 1110 each of the cushioned caps 950, 1000, 1100 may be shaped to engage the control stick 1380 in a stretch fit, such that the cushioned caps 950, 1000, 1100 are removably retained on the control stick 1380. Thus, the cushioned caps 950, 1000, 1100 are retained on the control stick 1380 during normal use of the control stick 1380, but may be removed from the control stick 1380 by exerting additional force beyond the force applied during normal use.

Figure 42:
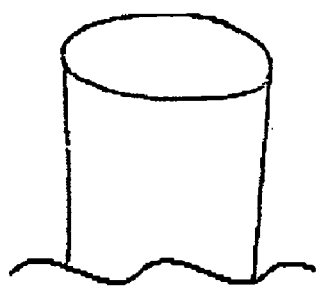
FIG. 42 is a perspective view of a portion of an alternate embodiment of a control stick in accordance with the present invention.

An alternate embodiment of a cursor control stick, indicated generally at 1480, is illustrated in FIG. 42 in accordance with the present invention. The control stick 1480 is generally circular in cross-section. The control stick 1480 is mounted at a first end (not shown) to a suitable computer, such as the laptop computer 900 (as shown in FIGS. 25 and 26), the second end of the control stick 1480 is provided with a suitable cushioned cap, such as the cushioned caps 950, 1000, 1100 It will be appreciated that the respective recesses 960, 1010, 1110 each of the cushioned caps 950, 1000, 1100 may be shaped to engage the control stick 1480 in a stretch fit, such that the cushioned caps 950, 1000, 1100 are removably retained on the control stick 1480. Thus, the cushioned caps 950, 1000, 1100 are retained on the control stick 1480 during normal use of the control stick 1480, but may be removed from the control stick 1480 by exerting additional force beyond the force applied during normal use.

Figure 43:
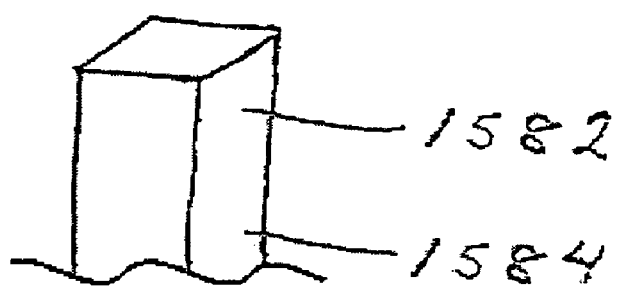
FIG. 43 is a perspective view of a portion of an alternate embodiment of a control stick in accordance with the present invention.

An alternate embodiment of a cursor control stick, indicated generally at 1580, is illustrated in FIG. 43 in accordance with the present invention. The control stick 1580 is mounted at a first end (not shown) to a suitable computer. such as the laptop computer 900 (as shown in FIGS. 25 and 26). The second end of the control stick 1580 includes an upper portion 1582 and a lower portion 1584. Both the upper portion 1582 and the lower portion 1584 are generally rectangular in cross-section. The cushioned caps 950, 1000, 1100 are suitable for use with the control stick 1580. It will be appreciated that the respective recesses 960, 1010, 1110 each of the cushioned caps 950, 1000, 1100 may be shaped to engage the control stick 1580 in a stretch fit, such that the cushioned caps 950, 1000, 1100 are removably retained on the control stick 1580. Thus, the cushioned caps 950, 1000, 1100 are retained on the control stick 1580 during normal use of the control stick 1580, but may be removed from the control stick 1580 by exerting additional force beyond the force applied during normal use.

Referring again to FIG. 33, the recess 1010 of the cushioned cap 1000 is shaped to receive both a control stick with circular cross-section and a control stick with rectangular cross-section in a stretch fit as described herein. The recess 1010 of the cushioned cap 1000 may be preferable because the cushioned cap 1000 may be used in combination with a control stick having any desired cross-section, such as circular, rectangular, hexagonal, or octagonal control sticks.

In another preferred embodiment, the upper portions and the lower portions of each of the cushioned caps illustrated in FIGS. 25 through 39 are formed of the same material and the material has a durometer between about 60 to about 85 Shore A. In a further preferred embodiment, the material of the upper portions and lower portions of each of the cushioned caps illustrated in FIGS. 25 through 39 has a durometer of about 74 Shore A. It will be appreciated that the measurement of the durometer of the material of the cushioned caps may vary from the desired durometer by about 5 Shore A due to variations in molding and variations in durometer measurement techniques. It will be appreciated that the durometer of the material, the shape as described herein, and the surface shape and/or texture of the cushioned caps contribute to the overall desired feel of the cushioned caps.

It will be appreciated that any combination of the elements of the embodiments described herein may be combined and practiced together in accordance with the present invention.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An electronic device comprising:
    a housing;
    a processor disposed within the housing;
    a control stick communicably connected to the processor for inputting data; and
    a cushioned cap having a lower portion defining a recess for receiving at least a portion of a control stick, and
    an upper portion having an outer surface including a plurality of nubs, the nubs increasing in height across the outer surface from the center of the outer surface toward the periphery of the outer surface.

2. The electronic device of claim 1, wherein the lower portion has a lower periphery and the upper portion has an upper periphery which overhangs the lower periphery.

3. The electronic device of claim 2, wherein the lower portion includes a radially extending flange, and the upper portion rests on the flange.

4. The electronic device of claim 2, the recess having a first portion with a first cross-sectional area, the first portion communicating with an opening in the exterior of the cushioned cap, and the recess having a second portion having a second cross-sectional area that is smaller than the first cross-sectional area.

5. An electronic device comprising:
    a housing;

a processor disposed within the housing;
a control stick communicably connected to the processor for inputting data, the control stick having an upper end; and
A cushioned cap including a cushion made of a resilient material having a stepped bore formed partially therethrough, the bore having a first portion with a relatively larger cross-sectional area, the first portion communicating with an opening in the exterior of the cap, and the bore having a second portion having a relatively smaller cross-sectional area relative to the first portion, the bore receiving the upper end of the control stick.

6. The electronic device of claim 5, wherein the cushioned cap includes a lower portion having a lower periphery and an upper portion having an upper periphery which overhangs the lower periphery.

7. The electronic device of claim 6, wherein the lower portion includes a radially extending flange, and the upper portion rests on the flange.

8. The electronic device of claim 5, the cushioned cap having an outer surface including a plurality of nubs, the nubs increasing in height across the outer surface from the center of the outer surface toward the periphery of the outer surface.

9. A computer comprising:
a housing;
a processor disposed within the housing;
a control stick communicably connected to the processor for inputting data, the control stick having an upper end; and
a cushion constructed of a resilient material, the cushion including a pocket that is adapted to receive the upper end of the control stick for removeably attaching the cushion to the control stick, the cushion including a lower portion having a lower periphery and an upper portion having an upper periphery which overhangs the lower periphery.

10. The computer of claim 9, wherein the upper periphery is an upper diameter.

11. The computer of claim 10, wherein the lower periphery defines a lower diameter that is smaller than the upper diameter.

12. The computer of claim 11, wherein the cushion is made of a material having a durometer between about 60 and about 85 Shore A.

13. The computer of claim 11, wherein the lower portion includes a radially extending flange, and the upper portion rests on the flange.

14. The computer of claim 10, wherein the upper portion includes an upper surface defining an open pattern texture.

15. The computer of claim 9, the recess having a first portion with a first cross-sectional area, the first portion communicating with an opening in the exterior of the cap, and the recess having a second portion having a second cross-sectional area that is smaller than the first cross-sectional area.

* * * * *